(12) United States Patent
Mulligan et al.

(10) Patent No.: US 9,542,069 B2
(45) Date of Patent: Jan. 10, 2017

(54) SYSTEM AND METHOD FOR CREATING ON-DEMAND PRODUCTS

(71) Applicant: MiFaktory Ltd., Kwei Tei St. Shatin (HK)

(72) Inventors: Brennan Mulligan, Kowloon (HK); Oleksandr Zadorozhnyy, Kiev (UA); David Triebwasser, Richmond, CA (US); Peter Stromberg, Hinnerup (DK)

(73) Assignee: MiFaktory Ltd, Kwei Tei St. Shatin (HK)

( * ) Notice: Subject to any disclaimer, the term of this patent is extended or adjusted under 35 U.S.C. 154(b) by 0 days.

(21) Appl. No.: 14/474,792

(22) Filed: Sep. 2, 2014

(65) Prior Publication Data

US 2015/0066189 A1    Mar. 5, 2015

Related U.S. Application Data

(60) Provisional application No. 61/873,097, filed on Sep. 3, 2013.

(51) Int. Cl.
| | |
|---|---|
| G06F 19/00 | (2011.01) |
| G06F 3/0481 | (2013.01) |
| G06Q 30/06 | (2012.01) |

(52) U.S. Cl.
CPC ....... G06F 3/04815 (2013.01); G06Q 30/0621 (2013.01)

(58) Field of Classification Search
CPC ............ G06Q 30/0621; G06Q 30/0641; G06Q 30/0643; G06F 3/1257; G06F 3/04815
USPC .................................................. 700/130–132
See application file for complete search history.

(56) References Cited

U.S. PATENT DOCUMENTS

| | | | | |
|---|---|---|---|---|
| 5,727,253 | A * | 3/1998 | Wilkinson | F41H 3/00 2/69 |
| 6,564,118 | B1 * | 5/2003 | Swab | G06Q 30/02 700/130 |
| 7,191,145 | B1 * | 3/2007 | Lunetta | G06Q 30/02 382/284 |
| 7,657,340 | B2 * | 2/2010 | Lind | A41H 3/007 345/419 |

(Continued)

FOREIGN PATENT DOCUMENTS

| | | |
|---|---|---|
| CN | 1779687 A | 5/2006 |
| CN | 101847173 A | 9/2010 |
| WO | 2008077014 A2 | 6/2008 |

OTHER PUBLICATIONS

Int'l Search Report issued Feb. 18, 2015 in Int'l Application No. PCT/IB2014/002132.

(Continued)

*Primary Examiner* — Nathan Durham
(74) *Attorney, Agent, or Firm* — Panitch Schwarze Belisario & Nadel LLP

(57) ABSTRACT

A method of creating three-dimensional products customized with user-selected images is described. The method includes storing definitions of products comprising components, receiving indication of selection by a user of a product, receiving indication of selection by a user of at least one image for printing on the product, receiving information regarding placement of the selected image on components of the product, preparing a two-dimensional representation of the components of the product with the image arranged thereon, and causing the printing of the two-dimensional representation on a material.

24 Claims, 35 Drawing Sheets

(56) References Cited

U.S. PATENT DOCUMENTS

| | | | | |
|---|---|---|---|---|
| 8,731,703 B1* | 5/2014 | Lehrer | ............... | G06F 3/1257 |
| | | | | 700/132 |
| 8,963,958 B2* | 2/2015 | Berger | ............... | G06T 15/04 |
| | | | | 345/419 |
| 2001/0026272 A1* | 10/2001 | Feld | ............... | A41H 3/007 |
| | | | | 345/419 |
| 2001/0050690 A1* | 12/2001 | Giles | ............... | G06Q 30/06 |
| | | | | 345/636 |
| 2004/0049309 A1* | 3/2004 | Gardner | ............... | A41H 1/00 |
| | | | | 700/132 |
| 2004/0172325 A1* | 9/2004 | Blanco | ............... | G06Q 30/02 |
| | | | | 705/14.4 |
| 2005/0007378 A1* | 1/2005 | Grove | ............... | G06T 11/001 |
| | | | | 345/582 |
| 2005/0131571 A1* | 6/2005 | Costin | ............... | G06Q 30/0601 |
| | | | | 700/132 |
| 2005/0177453 A1* | 8/2005 | Anton | ............... | G06Q 10/087 |
| | | | | 705/26.41 |
| 2005/0289018 A1* | 12/2005 | Sullivan | ............... | G06Q 30/00 |
| | | | | 705/26.5 |
| 2006/0031392 A1* | 2/2006 | Lunetta | ............... | G06T 11/60 |
| | | | | 709/217 |
| 2008/0141441 A1* | 6/2008 | Canter | ............... | D06P 5/00 |
| | | | | 2/227 |
| 2014/0215682 A1* | 8/2014 | Northup | ............... | B41M 5/0256 |
| | | | | 2/69 |
| 2015/0208746 A1* | 7/2015 | Schindler | ............... | G06Q 10/06 |
| | | | | 700/132 |

OTHER PUBLICATIONS

International Preliminary Report on Patentability issued Mar. 17, 2016 in International Application No. PCT/IB2014/002132, 7 pages.

* cited by examiner

SYSTEM AND METHOD FOR CREATING ON-DEMAND PRODUCTS

CROSS-REFERENCE TO RELATED APPLICATIONS

This application claims the benefit of priority to U.S. Provisional Patent Application No. 61/873,097 filed Sep. 3, 2013.

BACKGROUND OF THE INVENTION

In recent years, on-demand printing of user designs and images onto garments and other items has gained popularity. Typically, such on-demand printing allows a user to add artwork or designs to an already manufactured item such as a t-shirt, sweatshirt, shoe, bag, and the like. Printing these user-generated designs and graphics on finished garments and other objects is typically limited to small, pre-defined areas of the product, in part because the artwork cannot traverse seams. Alternatively, even if the artwork can traverse seams of the finished item, the inks cannot penetrate the seams and wrinkles of the pre-manufactured products. Therefore, the printing on these pre-manufactured blanks is either limited to a small area, or is interrupted by highly visible seam lines and wrinkles breaking up the artwork.

In practice, providers of such printing services purchase desired items from manufacturers and utilize printing machinery and techniques (e.g., inkjet printing) to print user submitted art onto the items. The pre-manufactured nature of such items limits the ability to print art to seamless, or otherwise generally planar, surface areas because seams and other non-planar areas and edges can cause damage to the printing machinery. Accordingly, users have previously been limited in their ability to customize and design desired items. For example, due to these constraints, a user may not be able to create a t-shirt having a design that wraps around the body, or over the shoulders and sleeves, of the shirt.

In addition, because current web-based visualization techniques for visualizing placement of user-generated art on products (e.g., "configurators") are photographs or illustrations of pre-manufactured products and are without awareness of the manufacturing files for the given product, including the products seams or joined edges, product visualization methods have similarly been limited to displaying user-selected images on individual surfaces of the item. For example, a user wishing to place an image extending from a body of a shirt to its sleeve may not be able to visualize the appearance and distortion of such a placement on the product's three-dimensional surface. That is, it was previously not possible to visualize the appearance of the placement of a design on multiple surfaces of an item due to the inability of design tools to properly render the item as a 3D model, from 2D manufacturing files, while displaying the proper distortion characteristics. Likewise, current visualization software does not account for the non-visible seams, such that the artwork traversing seams is programmatically bled into the joining seams, whereby the artwork will appear seamlessly on both the 3d model and the finished, manufactured product.

Accordingly, it is desirable to provide a system to generate three-dimensional (3D) models of desired objects to allow a user to visualize the appearance of such artwork and designs on the desired objects prior to manufacturing thereof.

BRIEF SUMMARY OF THE INVENTION

In one embodiment, a method of creating three-dimensional products customized with user-selected images is described. The method includes storing definitions of products comprising components, receiving indication of selection by a user of a product, receiving indication of selection by a user of at least one image for printing on the product, receiving information regarding placement of the selected image on components of the product, preparing a two-dimensional representation of the components of the product with the image arranged thereon, and causing the printing of the two-dimensional representation on a material.

In another embodiment, a system for manufacturing a customized product is described. The system includes a server system and a print system. The server system is configured to receive, over a network, user input from users. The user input identifies a desired product and at least one user-submitted product customization. The desired product is composed of a plurality of components. The server system generates a three-dimensional model of the desired product with the at least one user-submitted customization, and a two-dimensional representation of the components of the customized desired product based on the three-dimensional model. The print system is configured to process the two-dimensional representation to output components on a raw material.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIG. 1b is an exemplary flowchart of steps for incorporating a source image into print output of a desired object by the product designer system of FIG. 1a;

FIG. 1c is an exemplary flowchart of steps for creating an XML pattern and a 3D model from an industry standard design file according to preferred embodiments of the product designer system of FIG. 1a;

FIG. 2 is an exemplary user interface of the product designer system of FIG. 1a;

FIG. 3 is a an exemplary user interface of a template editor of the product designer system of FIG. 1a;

FIG. 4b is a listing of the component objects of the item of FIG. 4a;

FIGS. 5a and 5b are exemplary views of a t-shirt object having vertical wrapping and horizontal wrapping, respectively, in accordance with preferred embodiments of the product designer system of FIG. 1a;

FIG. 9 is an entity relationship diagram of the entities of a product according to the preferred embodiments of the product designer system of FIG. 1a;

FIGS. 12-17 are exemplary views of the user interface of FIG. 2 illustrating steps for creating a t-shirt using the product design tool of FIG. 1a;

DETAILED DESCRIPTION OF THE INVENTION

Figure 1A:
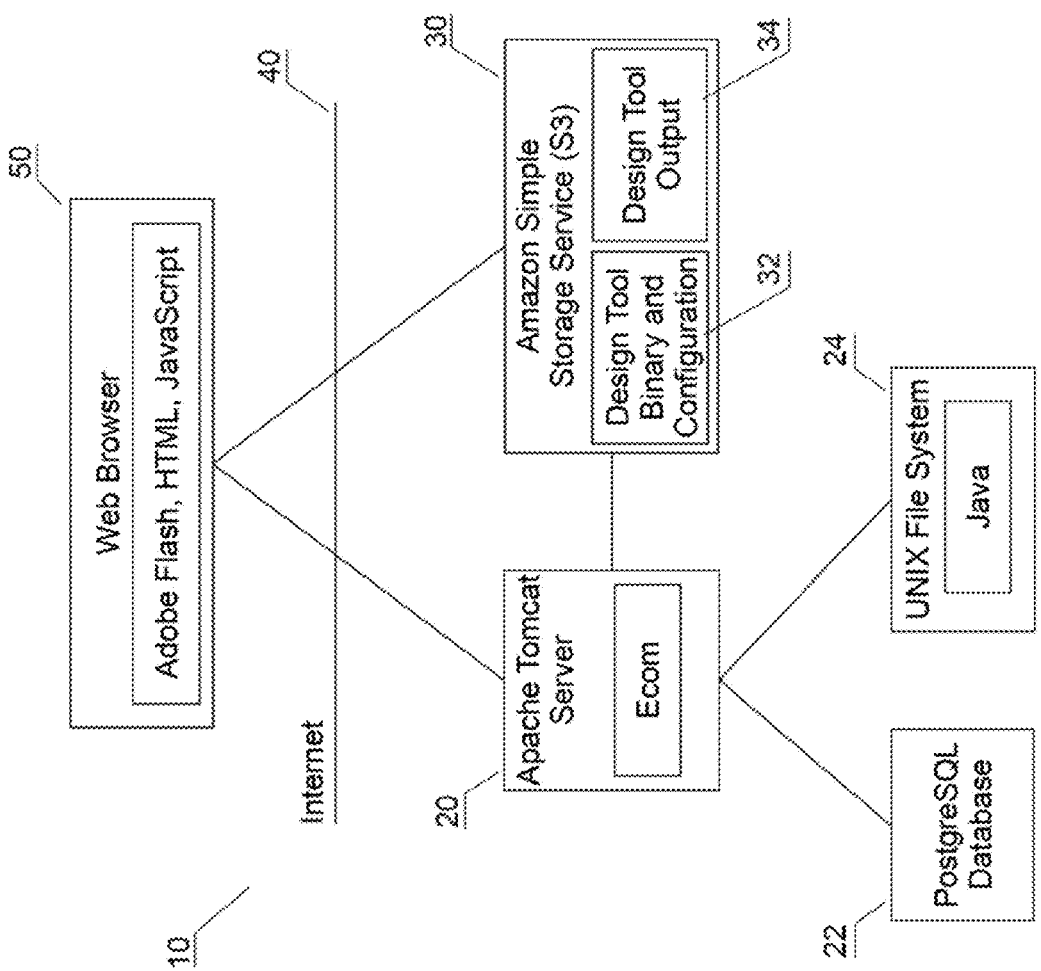
FIG. 1a is a system diagram of a client-server product designer system according to preferred embodiments of the present invention.

Certain terminology is used herein for convenience only and is not to be taken as a limitation on the present invention. In the drawings, the same reference letters are employed for designating the same elements throughout the several figures.

The present invention provides a computer-implemented system and process for preparing a three-dimensional model of a two-dimensional design based on industry-standard (e.g., DXF, CAD) design files. The three-dimensional model may be of any product suitable for printing, but is preferably a garment such as a t-shirt, sweatshirt, tank top, shorts, pants, socks, underwear, or the like. The product may also be any other type of wearable or non-wearable product suitable for marking a design thereon, such as shoes, pillows, curtains, furniture, luggage, bags, hats, swimwear, electronic cases, and the like. The system allows a user to upload one or more designs and layer them on top of each other, and/or create tiled or otherwise arranged patterns using the uploaded art. Preferably, the user is able to view the design on a 3D model that takes into account distortions necessary for mapping 2D images onto 3D models of the product.

In a preferred embodiment, the present invention is implemented by a client-server based designer system. The designer system allows a user to design products via a user interface (see FIG. 2) that allows users to view their uploaded art modeled on a 3D product. The designer system accurately wraps the uploaded art onto the 3D product. Preferably, the user is able to rotate the 3D product in all dimensions to view all angles of their creation. The designer system allows artists to position, scale, rotate, and wrap their artwork across multiple pieces of a product, including wrapping artwork across seams, and onto interior pieces, of the product. The system preferably allows users to color each piece of the product with a color of their choice, add artwork to each piece of the product individually or jointly, and allows users to use any of their uploaded artwork as a pattern that can be repeated across the entire product or a part of it. The system further allows the user to select the color thread used to sew the product together, and other functional elements of the product, such as adding pockets, straps, and other features and accessories. Preferably, the system supports any type of product that can be represented by a 3D model by generating 2D print files that can then be sent to a printer of the required material types to print out the individual components on the raw materials that make up the product. The raw materials (e.g., fabric) are then cut and sewn, or otherwise fabricated, into the final product. Preferably, the products are made on-demand, one at a time, and maintain a retail quality level, thereby allowing artists to create products which meet and exceed the quality of existing large run production.

FIG. 1a is a diagram illustrating the general relationship between relevant entities of a product design system 10. In the preferred embodiment, the major entities that interrelate to comprise the overall product design system 10 are one or more servers 20, 30 connected over a network 40 (e.g., the Internet) to a computer system having a web browser 50, or other application (not shown) such as a mobile application for use on a tablet computer, or the like. In the preferred embodiment, the servers 20, 30 include an Apache web server, for implementing E-commerce applications, and one or more storage servers 30. The web server 20 is communicatively coupled to a SQL database 22 and a UNIX File System 24. Preferably, the storage servers 30 are implemented in a cloud-based storage system, such as AMAZON S3, or the like. The storage servers 30 include a design tool binary and configuration storage 32, and a design tool output 34. While in one embodiment of the product design system 10, the web server 50 may be considered part of the system, in other embodiments, the product design system 10 transmits user interfaces and other data for display by the web server 50.

Figure 1B:
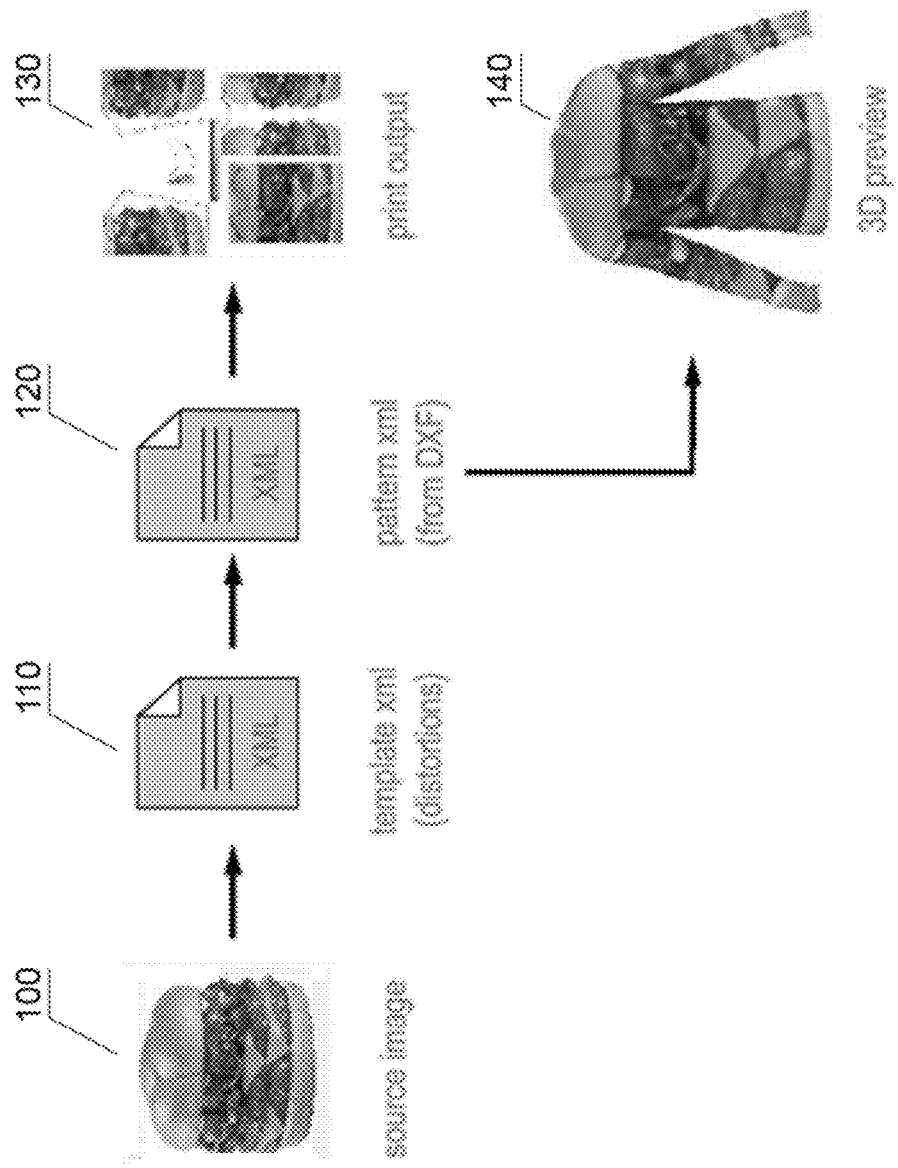

Referring to FIG. 1b, a representative flowchart of steps for converting a source image to print output by the product design system 10 is shown. At step 100, a source image is input by a user. At steps 110 and 120, templates XML data and pattern XML data are applied to the source image in order to position the source image onto a desired product. Thus, templates XML data and pattern XML data preferably correspond to a desired product. The templates XML of step 110 contain information regarding how a texture (i.e., the source image) is applied to a particular product. For example a t-shirt might wrap around the waist or over the shoulder, while shoes may have a design mirrored on each shoe, or have one design stretching across both shoes. The pattern XML of step 120 is an XML file containing a 2D representation of the pieces of a garment or other product to be printed on.

Figure 1C:
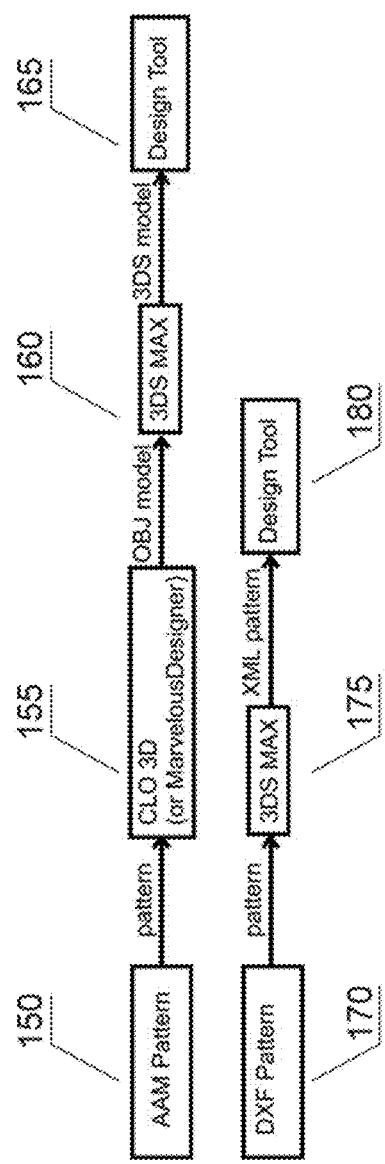

FIG. 1c is pair of flow charts of a model generation process utilizing one or more 3D design tools to convert a pattern file to a 3D model for use with the product design system 10. The pattern XML file is preferably created by taking a manufacturing pattern (e.g., an industry standard design file) and parsing it through a plug-in for modeling software. The process may vary depending upon the format of the pattern XML file. In the case of an AAM pattern, the pattern is selected at 150, processed by an application, such as CLO 3D or MarvelousDesigner, at 155 into an OBJ model, then processed at 160 by 3DS MAX to produce a 3D model for use with the design tool at 165. In the case of a DXF pattern, the pattern is selected at 170, processed by an application such as 3DS MAX at 175 to produce and XML pattern for use with the design tool at 180.

The boundary of each pattern piece is a closed curve, usually a polygon. Each piece of the pattern has one (1), two (2) or three (3) closed curves associated with it. These closed curves may be selected from:

Cutting line—The line where the material will be cut in production. Every piece must include a cutting line. Cutting lines will also have notch marks distributed around the edge of the cut line, so as to aid manufacturing operators to compose pieces together (e.g., for sewing) and align artwork where the artwork traverses joining seams on either side of the printed parts.

Sewing line—typically this line represents where the pattern pieces will be sewn together, and often the edge of the area that will be visible in the physical garment. For some items there may be no sewing line, as for example the insole of a shoe. In this case a sewing line can be omitted, and the cutting line is used as a sewing line. The sewing line, while of minor consequence in the physical manufacturing process, is often of paramount importance in the 3D visualization, as it often marks the object's exact area visible in the 3D model (i.e., texture coordinates will be calculated based on the dimensions of the area, covered by the sewing line).

VPA line—this is an optional line, also called the Visible Printed Area boundary, that is a line added explicitly to match the UV boundary with the pattern (if it isn't present, the sewing line is used for this purpose). When a seam or hem is made in 3D, they require no extra material, whereas in reality there may be a folded centimeter or more ("seam allowance"). If the sewing line does not match the area visible on the 3D model exactly, a VPA line is defined to provide precise rendering of the 3D model.

Once a product has been selected, the user (e.g., a template designer or artist) may create a mapping template, or refine a position of the artwork on the desired product. In such a case, one or more servers 20, 30 process the source image input at step 100 (FIG. 1b) to position, scale, rotate and warp the template and/or artwork onto a 2D pattern at step 130. The 2D pattern is generated at step 130 for use with the desired product. In order to provide visual feedback to the user, the one or more servers optionally map the 2D pattern on a 3D model at step 140. The generated 3D model is preferably displayed to the user to provide real-time feedback regarding the design.

Figure 2:
Figure 18:
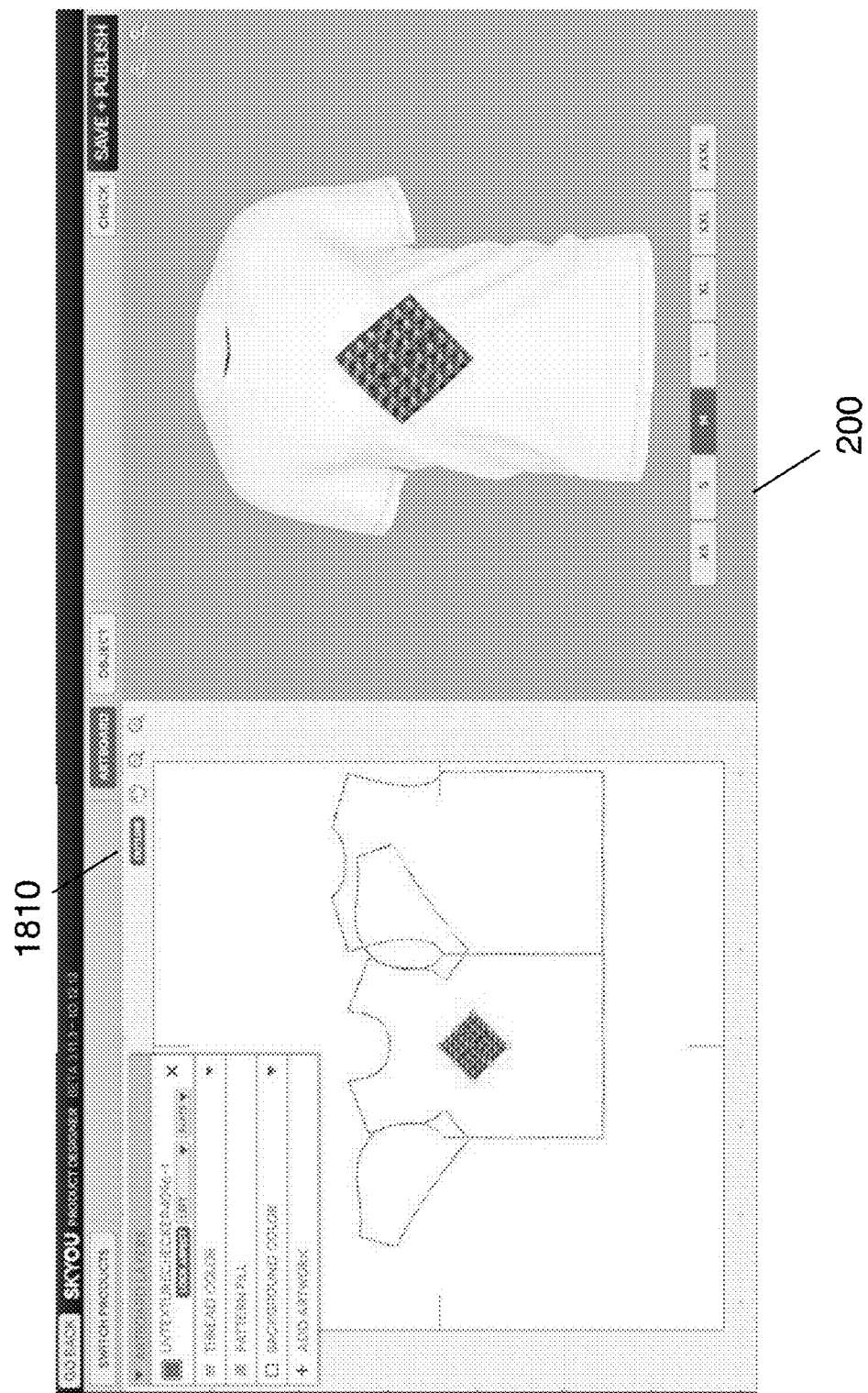
FIG. 18 is an exemplary user interface of the product design tool of FIG. 1a showing an "outline" button.

Referring to FIG. 2, a user interface 200 of the product design system 10 facilitates the source image input, manipulation, and 3D model viewing process. A user utilizes the user interface 200 to select one or more images for placement on a desired product. An artboard portion 210 of the user interface 200 allows the user to manipulate the selected one or more images on the desired product. The 3D Preview view portion 220 of the user interface 200 preferably displays the 3D model of the desired product with any artwork from the artboard view 210 applied thereto, thereby providing visual feedback of the positioning and/or design process. Furthermore the artboard provides an option to view the 2D pattern pieces laid out on the artboard to assist in understanding the relationship between the artboard and the 3D model for a given template. In a preferred embodiment, users can toggle this feature on and off using the "outline" button 1810 shown in FIG. 18.

This 3D representation shown in the 3D Preview view 220 helps the user to understand the complex relationship between the 2D pattern shown on the artboard view 210, which, when sewn together, form the full image of the 3D model shown in the 3D Preview view 220. In alternative embodiments, the 3D Preview view 220 may be removed without departing from the scope of this invention.

In one embodiment, the user interface 200 of the product design system 10 is implemented using ADOBE FLASH, MICROSOFT SILVERLIGHT, or the like. The artboard view 210 is preferably a 2D workspace used to place images and other layers (e.g., solid color fills, repeating patterns, visual effects) for printing on a desired object. In one embodiment, the artboard 210 has a nominal size of approximately 8192×8192 pixels. Preferably, the artboard 210 may be hidden when it is not needed. When a desired source image, which is preferably a high-resolution image suitable for large-scale printing, is input at step 100, it is initially shown on the artboard view 210 in its actual size. However, those skilled in the art will understand that other sizes of the artboard 210, and other sizes of the source image may be utilized without departing from the scope of this invention.

Figure 19:
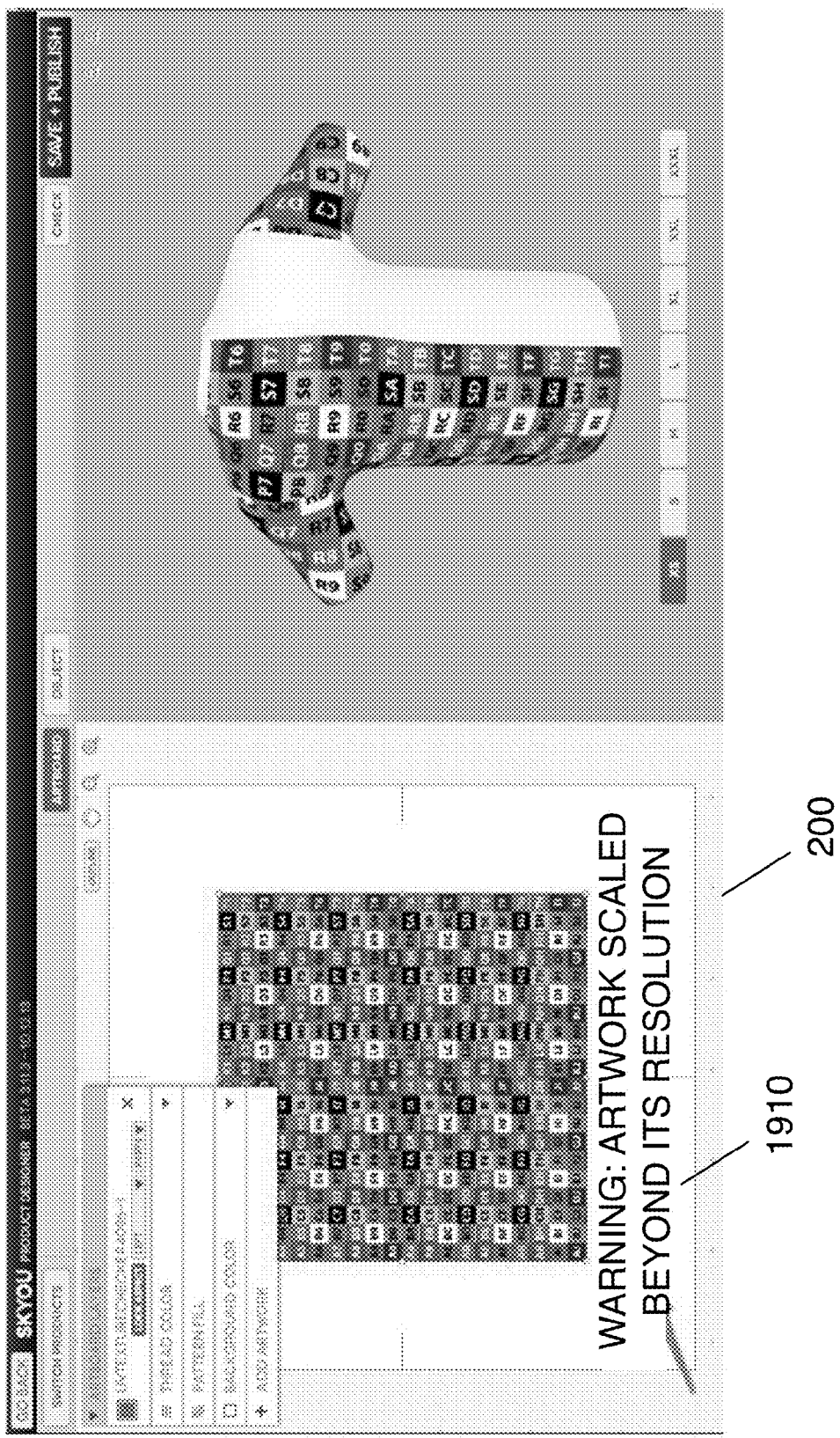
FIG. 19 is an exemplary user interface of the product design tool of FIG. 1a showing an alert to the user that the image will print poorly.
Figure 20:
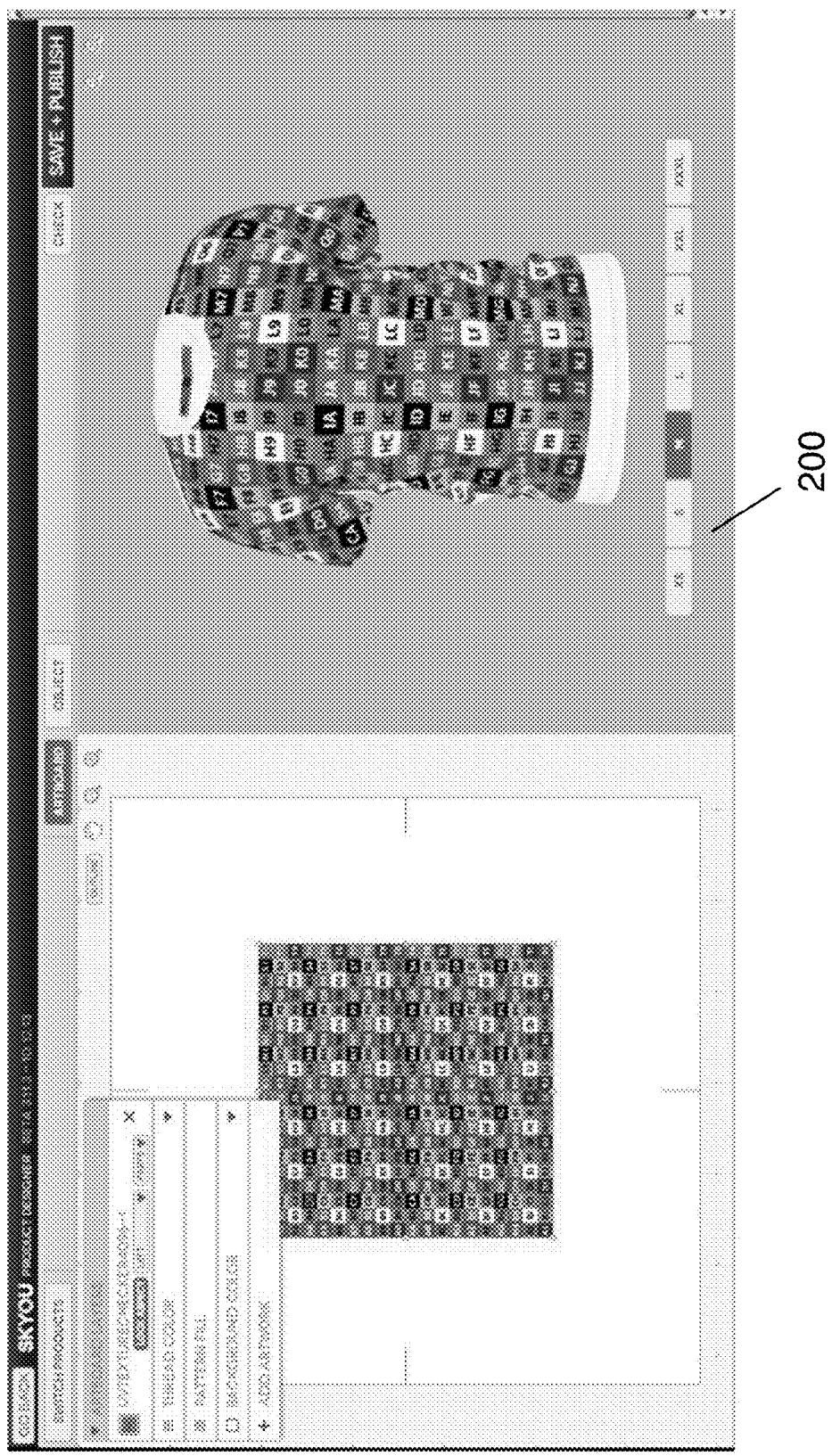
FIG. 20 is an exemplary user interface of the product design tool of FIG. 1a showing a user interface for selecting a size of a product for display.

In one embodiment, the uploaded high-resolution image is substituted for a low-resolution version of the same image in order to improve system performance and response time, and to reduce the bandwidth and computation requirements. When the low-resolution source image is shown on the artboard 210, it is preferably scaled to show its actual size, thereby providing a 1:1 relationship between the source image and the print media. Furthermore, when an image is scaled past the pixels required for optimized printable resolution, for a given product, a warning appears to alert the user that the image will print poorly and excessively scaled FIG. 19. In order to be able to see these images, the entire artboard 210 is preferably scaled down to fit the area reserved for it, such as half of the window size of the user interface 200. However, this is preferably a purely visual scaling, leaving the graphics data untouched.

Once the user has made the necessary adjustments to the artwork and/or design on the artboard 210, the artwork continues to the transformation process. At this time, the artwork is a snapshot of the artboard 210, including any layers that might have been added. When the artwork is applied to a piece of the product's pattern, it is preferably always a bitmap image 8192×8192 pixels in size. In other embodiments, in order to increase the output resolution, the artboard 210 can have an increased nominal size. The same artwork, a snapshot of the artboard 210, is sent to each piece in the pattern XML (e.g., back, torso, left arm, right arm, etc.) in order to undergo a transformation that is specific for that pattern piece. For example, the arm pattern piece may require the image to be rotated in order to approximately match up with the art on the torso pattern piece.

The new, scaled, bitmap image is then fed into a distortion matrix. The distortion matrix is a regular rectangular grid, vertices of which can be adjusted so that artwork that normally would not align properly can flow intuitively over a seam of a product. For example, in the side seam under the arm on a fitted women's t-shirt, the seams are arched, not straight, so the artwork must be broader at the top and bottom, and narrower in the middle, in order for the artwork to match all the way down the side seam. The area represented by the artboard 210 depends on the output resolution required for the particular product. For example, a t-shirt has a circumference of approximately forty-four (44) inches, so in order to place artwork that wraps all the way around, the artboard 210 should represent at least 44 inches. At a print resolution of one hundred fifty dots-per-inch (150 dpi), considered the minimum for cotton garments, the artboard 210 must have a width of 150 dpi×44 inches=6600 pixels. Similarly, for a smart phone cover with a height of 8 inches, to print at 1440 dpi, the artboard 210 size would be 8 inches×1440 dpi=11520 pixels.

Figure 3:
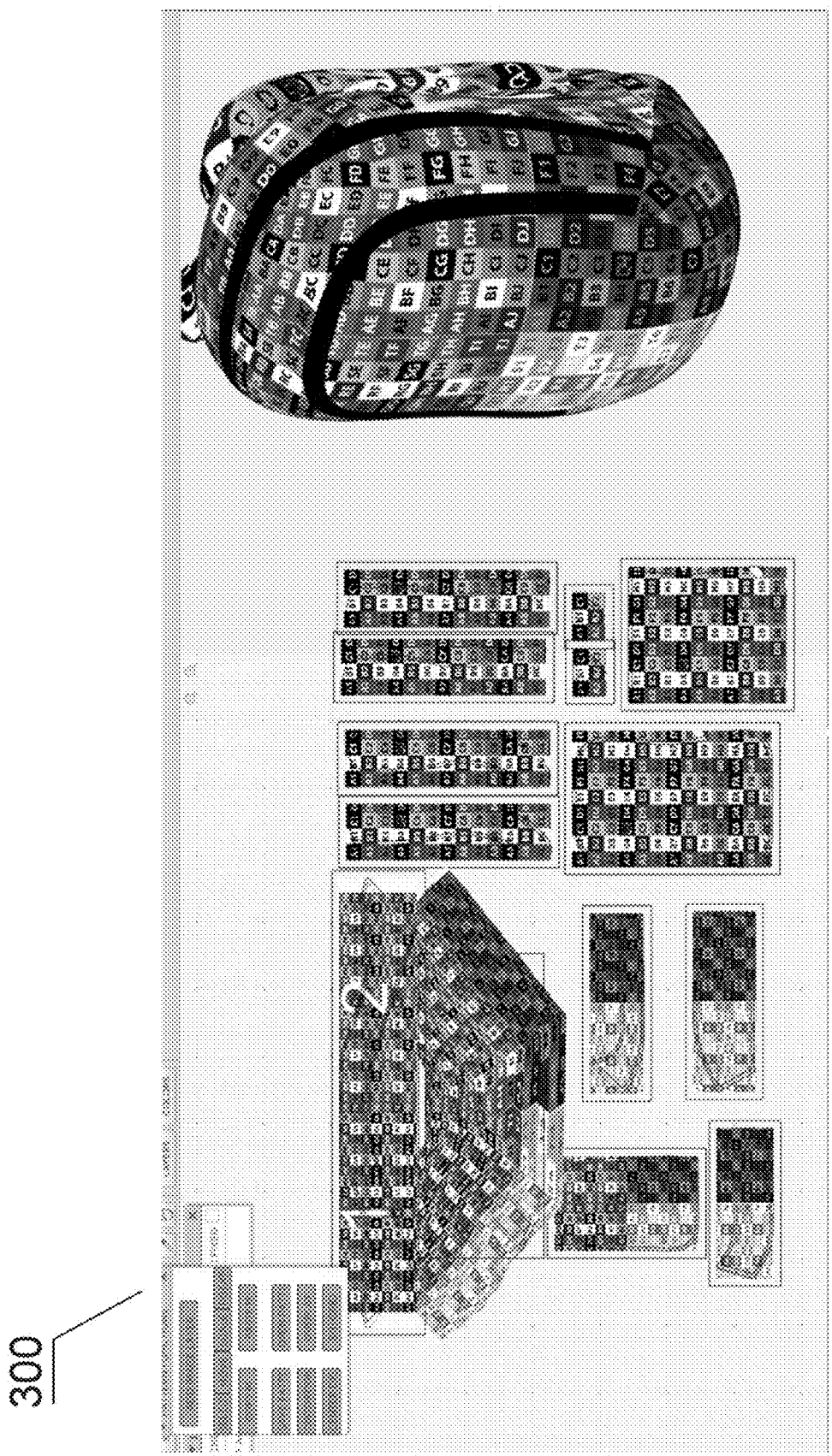

FIG. 3 is an illustration of a Template Editor 300 of the product design system 10 used to create the necessary distortion mappings. The Template Editor 300 preferably creates product templates to be used with the product design system 10. As shown in FIG. 3, the Template Editor 300 includes a transformation-editing screen. The Template Editor 300 starts by loading a product pattern, a product model, and a sample texture filling the artboard 210. The output of the Template Editor 300 is a template for that product, compatible with the product pattern input to the artboard 210. The model is used to visually verify how the template transforms a piece of artwork across components of the product. Each template defines for each of the pattern piece components a number of transformations from the artboard 210 space, to the component space. A template can have no transformations for a particular component, in this case that component is unaffected by the template.

The Template Editor 300 starts with an empty template, with no components having any transformations defined. The user can select a particular component, and for that component, add, remove, reorder and edit transformations. Transformations are preferably listed in the order they are applied. Each separate transformation is preferably editable. New transformations may be added. In one embodiment, a transformation is defined as a piecewise linear transformation from the artboard 210 space to the component space.

This piecewise linear transformation may be defined as a set of triangles on the artboard 210 space. The set of triangles are non-overlapping and covering a contiguous area, and the image of each triangle's vertex on the component space. Then, the transformation is defined for all points inside any triangle, and is equal to the affine transform between that triangle and the triangle created by images of its vertices. The Template Editor 300 preferably allows direct manipulation on the images of the vertices and images of triangles, while not allowing direct source triangle creation and manipulation. In one embodiment, when a new template is created, two source triangles are created, covering the top-left and bottom-right halves of the artboard 210, totaling four distinct vertices. While editing a transformation, the user can select any number of vertices' images. When all three vertices of a triangle have their images selected, the triangle is considered selected. Some operations operate on source triangles, while others operate on vertices' images.

Exemplary operations on source triangles include:
1) Split—each selected triangle is split into four similar triangles, each one quarter of its area, filling the original triangle. Images of new vertices are chosen as an image of that point in the previous version of transformation.
2) Delete—all selected triangles are deleted, and the portion of the artboard 210 they were covering is no longer used in the transformation.

Exemplary operations on vertices' images include:
1) Move—a vertex or a group of vertices are dragged to their positions.
2) Rotate—a group of vertices is rotated around the component center or the geometric center of the group.
3) Scale—a group of vertices is scaled relatively to the component center.

Exemplary operations on the whole transformation include:
1) Mirror—mirror all the vertices horizontally across the component center.
2) Reset—restore all deleted triangles, allowing to access a part of the artboard 210 that became inaccessible after triangle deletion.

In an alternative embodiment, artwork mapping onto products is achieved by a projection system. In the projection system, splitting and distorting of the image is computed each time from the 3D model and position. To do so, the image is projected from a defined point of view on the model, and then that image is displayed on each component that is caught in the projection. The points of view are predefined for a model, or are computed from the artwork position, for example, as a point at some distance from the model, along the product surface at the artworks center.

Template Creation Process

An exemplary template creation process for products based on industry standard design files for use with the product design tool 10 will now be described. Each unique product typically includes several industry standard design files (e.g. AAM, DXF). AAM and DXF are industry standard CAD files that represent the 2D patterns from which manufactured products may be cut from raw materials and assembled into a finished product. Referring to FIG. 1c, for each unique product, these industry standard design files are transformed into XML data and 3D models that can be used by the product design system 10. During this process, it must be decided how images will be wrapped across contiguous seams by creating templates (wrapping maps). Preferably, multiple templates are created per product in order to allow artwork to stretch across a variety of contiguous seams.

In the exemplary template creation process, a 3D model for the product is created based on the AAM file. An exemplary workflow is to gather the proper design files; make a 3D model of the product using the design file(s); export the model to a 3D tool such as ADOBE 3DSTUDIO MAX, MARVELOUS DESIGNER, and the like, in order to split the product into its elements and name those elements; generate a detailed model; generate a pattern XML file; and make a template. This process is now described in further detail.

Figure 4A:
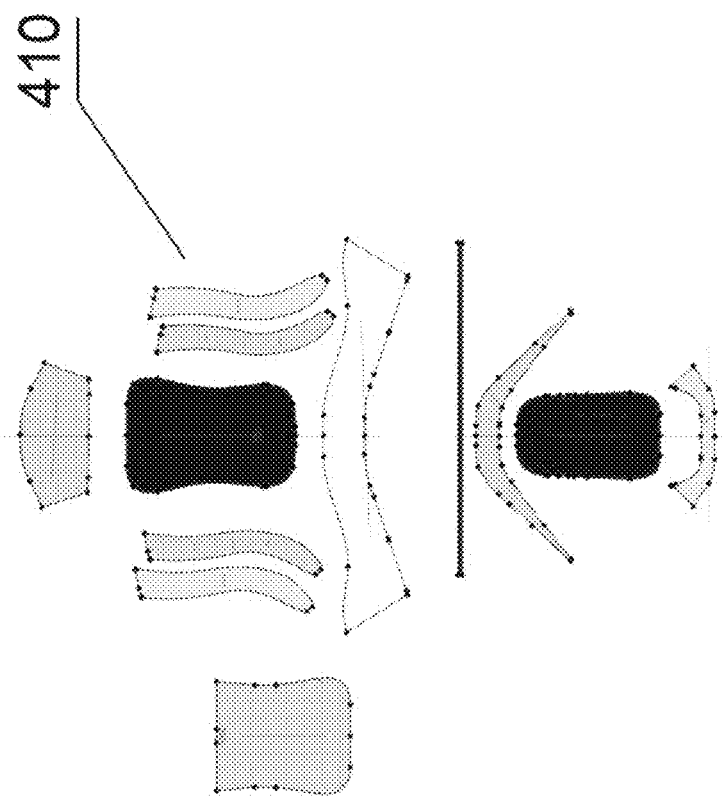
FIG. 4a is an exemplary view of an item as a whole and split into its component objects.
Figure 4A:
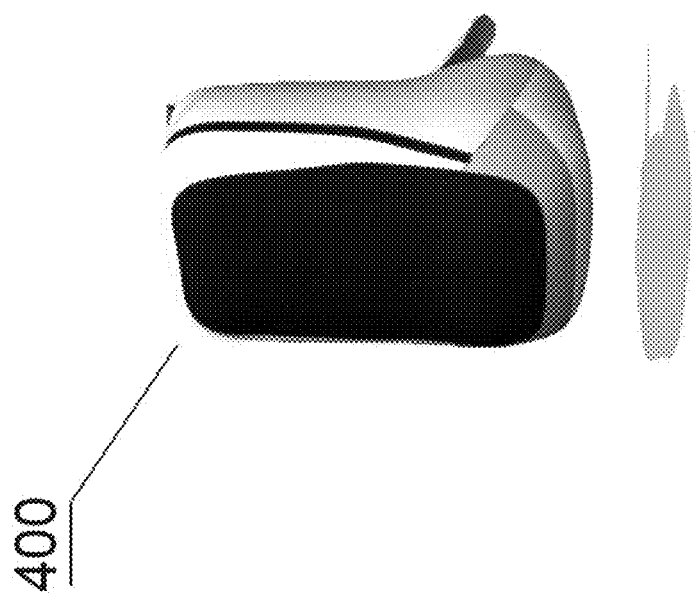
Figure 4B:
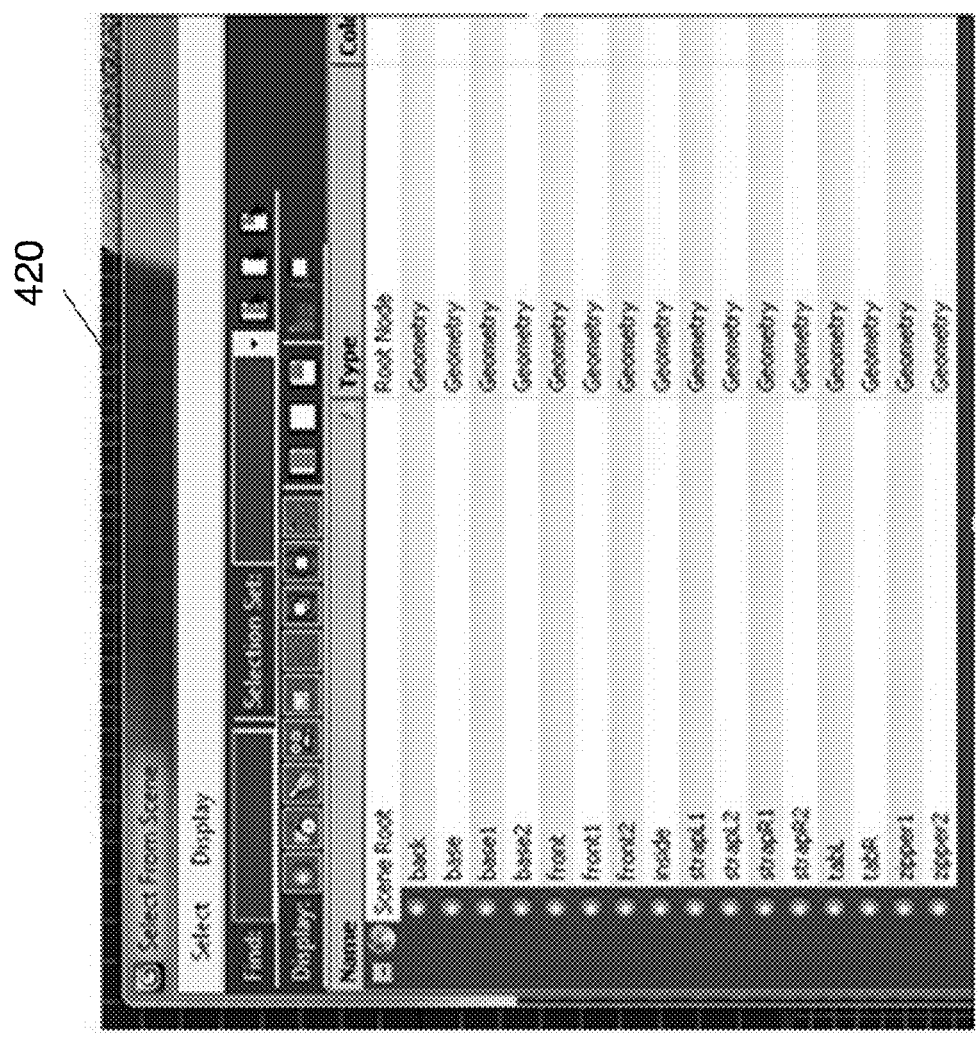

The design file is converted into a 3D model, and exported into a 3D editor such as ADOBE 3DSTUDIO MAX, where several actions are performed. First, referring to FIG. 4a, the product 400 is split into its separate objects, making sure that each object is named properly. In FIG. 4a, a backpack 400 is shown split into its separate objects 410. A listing 420 of the objects 410 is shown in FIG. 4b. A UV map (not shown) of each of the objects 410 is modified so that each of the objects 410 is scaled to the maximum, and centered on the UV map. The scale of the model is verified to ensure proper units and scaling. Finally, a transform of all elements is preferably reset, and a detailed model is optionally produced for presentation in the user interface 200 of the product design system 10.

A pattern XML file is created from the design file by cleaning the imported design file of any extraneous elements (e.g., isolated dots, lines, letters), and welding all nearby vertices that should be welded to ensure that all elements, except for notches, are closed. The pattern is organized so that each piece of a 3D model has its two matching pattern pieces in the design file. For example, "front" element from 3D model needs to have its "front_sew" (presenting a line where the cloth piece is being sewn) and "front_cut" (presenting a line where the cloth piece is being cut). All notches are merged into one element. The transform of all elements is preferably reset. Finally, using an XML exporter script, or the like, a pattern XML file is created.

In the preferred embodiment, the XML exporter script creates a new XML structure with the root <data/> and enumerates all of the available objects 410. For each object 410 that is not hidden, the script creates a <spline/> XML node with an attribute "name" equal to the name of that object 410. Then, the script adds an XML sub-node <vertices/> with a text value constructed from the vertices of the object 410. For each vertex, its X and Y coordinates are written, separated by commas.

Once the product model and pattern are created, the created model and pattern are preferably added to the product design system 10 as a new product. Next, the Template Editor 300 is used to create the first template for the new product by centering the artwork to the frontal piece and roughly aligning the artwork through the seams. The artwork should be continuous through all pieces of the created object, but there are many types of wrappings for many types of models.

Figure 5A:
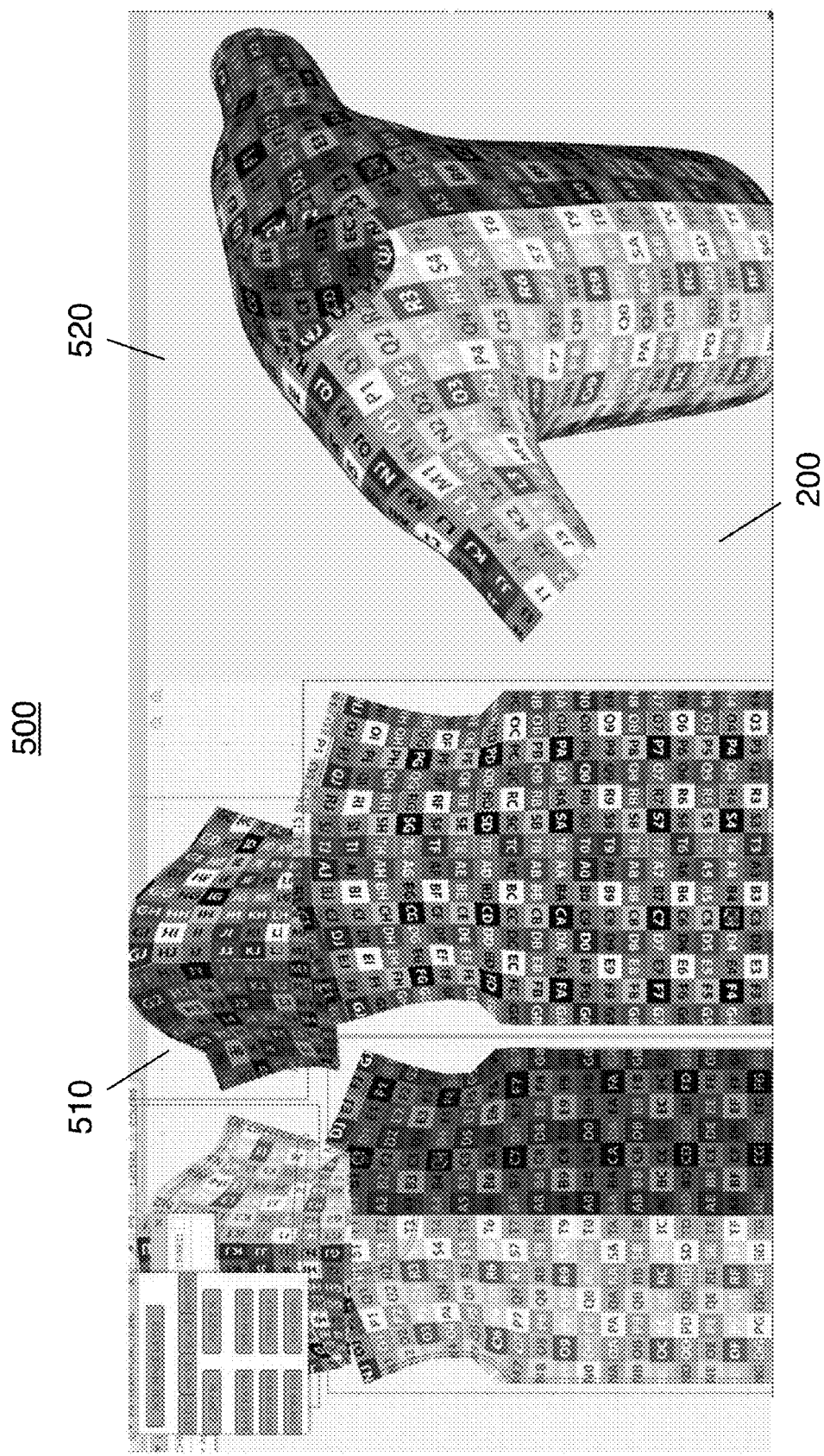
Figure 5B:
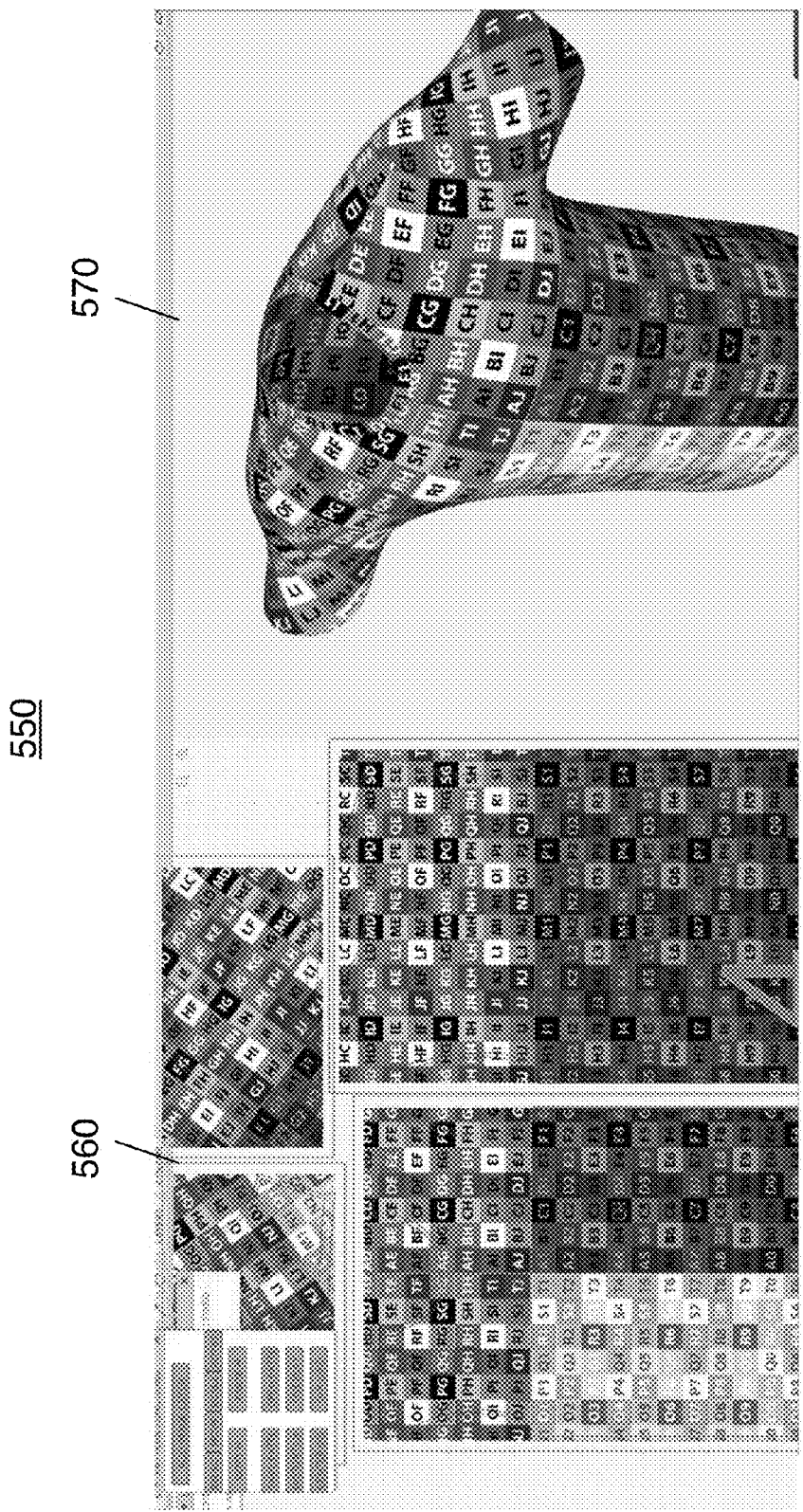

FIG. 5a is an illustration of a user interface 500 showing vertical wrapping of patterns 510 applied to a t-shirt rendering 520. Vertical wrapping is continuous through whole sleeves and shoulders, but not through sides under the armpits. FIG. 5b is an illustration of a user interface 550 showing horizontal wrapping of patterns 560 applied to a t-shirt rendering 570. Horizontal wrapping is continuous through front sleeves and sides (under the armpits), but not over the shoulders and on the back of the sleeves.

If the template does not appear to be smooth, grid density may be increased as necessary (e.g., number of the rows and columns in an existing grid can be multiplied by a factor, and new vertices extrapolated from the existing ones). In addition, the template may be modified by modifying the distortion grid until it is smooth and aligns through seams.

Figure 6:
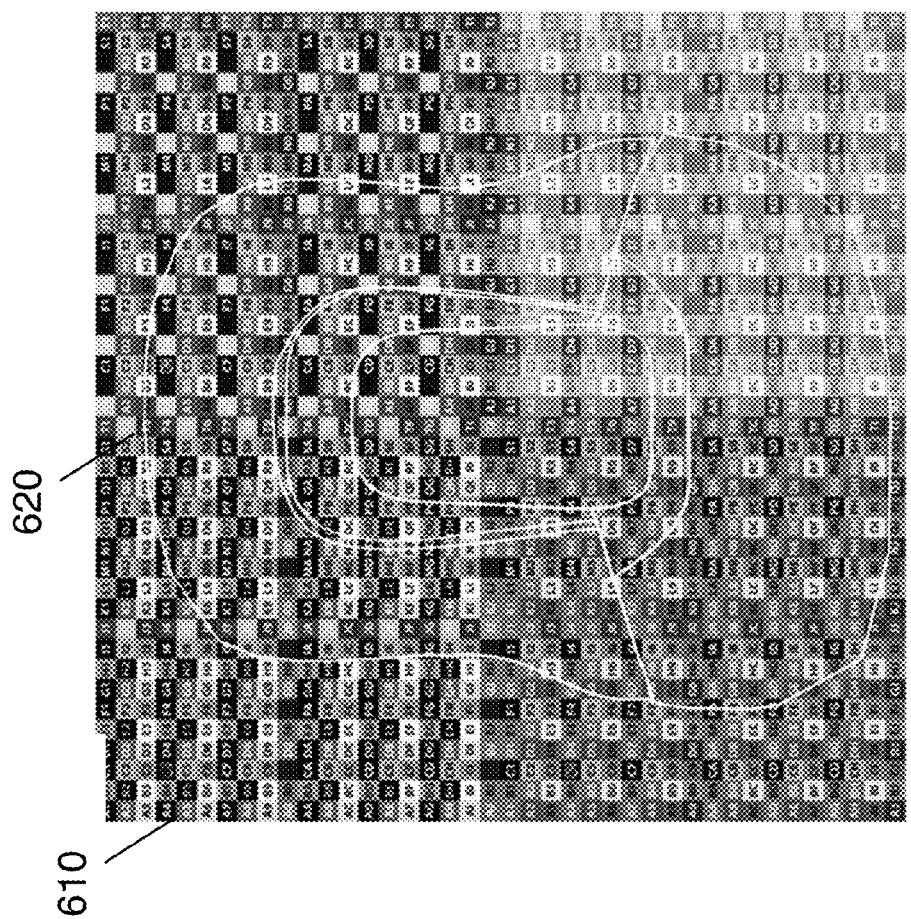
FIG. 6 is a view of a texture of a backpack with pattern outlines drawn on it for use as a size template.

Additional sizes of a same model may be created by building only simple models for each size. These templates preferably should match each other as closely as possible, so that the art transfers the same way on all sizes. After the first template is built, a user can provide a texture 610 with pattern outlines 620 drawn on it, as shown in FIG. 6.

Once a product or other object has been laid out, a sizing process is utilized to create sized garments or other objects from a nominal sized design. The sizing process involves using the design from, for example, a torso on one size of garment, and applying it to another torso, using a distortion grid to make the original image fit exactly into the perimeter of the new garment piece. Because the snapshot of the artboard 210 must retain the same position and proportions, when drawing different sizes (e.g., an XXXL t-shirt), it is first necessary to sample the image from the artboard 210 as if it were a default (e.g., medium) size. Otherwise the graphic may appear differently on different sizes. If fitting the perimeter of an existing size is impossible, designing each size requires creating templates using a separate 3D model for each garment size.

In an exemplary sizing process, a first default size and an "Overlay" are loaded. The overlay is preferably another pattern of the same object, with a different sewing and cutting line. The distortion matrix from the first pattern is removed and added to the new pattern. The user makes adjustments to points in the distortion matrix to make it fit the new pattern. When finished, the template is saved as a new template. In this way, a new template is created for a product without ever creating a 3D model simply by scaling and modifying an original master template. In order to use the new size template, extra parameters are added to the newly created template, reflecting the size of the original pattern pieces (i.e., minX, maxX, minY, maxY), called "nominalSize" in the pattern XML. This will capture the same area of the artboard 210 as in the original garment, and only then is the artboard 210 manipulated to fill the larger or smaller size pattern.

In one embodiment, an object defined in the design file may be imported into the product design system 10 based on the individual pattern pieces. In this case, the pattern pieces are renamed according to a desired naming scheme (e.g., name_cut and name_sew). The individual 2D pattern pieces are arranged by taking into consideration the weave of the cloth, or other material to be used for manufacturing the desired object. The arrangement on the screen will reflect how the object is presented in the finished print document, and therefore it is preferable to ensure that a minimum amount of material is used. All polygons (splines), representing the individual pattern pieces' outlines must be closed. Therefore, any extra segments, any small gaps in the polygons, or overlapping vertices that do not join, are removed prior to importing. It is vital to address these issues to use the pattern successfully for filling with color, patterns, etc. Similarly, actual notches should be removed from the sewing line, and detached from the cutting line. On the cutting line, they should be retained as a guide to the operator. The resulting design is exported to XML, resulting in all visible splines being exported.

An exemplary portion of an exported XML is shown below:

```
<data>
    <spline name="Line" knots="2" x="29.6193" y="-70.5797" closed="false">
        <vertices>29.6193,-56.7561,29.6193,-84.4034</vertices>
    </spline>
    <spline name="front_cut" knots="194" x="29.6193" y="-61.4576" closed="false">
        <vertices>48.0152,-40.6407,48.0598,..........-40.6607</vertices>
    </spline>
    <spline name="front_sew" knots="193" x="29.6193" y="-61.0431" closed="true">
        <vertices>49.357,-32.6471,.....,49.3396,-32.7008</vertices>
    </spline>
    <spline name="Line" knots="2" x="93.3105" y="-63.9225" closed="false">
        <vertices>93.3105,-44.7429,93.3105,-83.102</vertices>
    </spline>
    <spline name="back_cut" knots="164" x="93.3105" y="-62.7389" closed="true">
        <vertices>119.052,-96.9735,.....,-97.0208</vertices>
    </spline>
    .....
</data>
```

Once XML for a model of a product is created, the product is added to the product design system 10. Those skilled in the art will understand there is a plurality of ways to add products to an application. In the preferred embodiment, products are added using product XML having metadata for the created product. An exemplary product XML file for a t-shirt is shown below:

```
<?xml version="1.0" encoding="utf-8" ?>
<data>
<baseModel path=" mensLong.3ds" />
<mesh name="stitch" material="stitches" />
<material name="stitches" diffuseMap="stitches.png" specular="1"
repeat="true"ambient="0.2" color="0xFFFFFFFF" composite="true"
alphaBlending="true" />
</data>
```

The product XML file contains any information about special materials necessary for manufacturing the product. A "mesh" tag defines which meshes should have which material. In this example, "stitches" are being utilized.

The product is next added to the design system 10 by an entry in the product listing. A model entry is shown below:

```
<product id="13" name="Mans T-shirt Long" thumbPosition="0,
1016.3821411132813, -1860.4749755859375" thumb="models/LR-SL-
CC-FST/thumb.png"model="models/LR-SL-CC-FST/model.xml" pattern=
"models/LR-SL-CC-FST/pattern.xml" sizes="M" modelsize="M"
templates="mls" pallets="models/mansTlong/pallets.xml" zoom=
"2180" />
```

The model entry includes a list of values needed by the product design system 10. In the model, name identifies the product name. "Thumbposition" is the camera position from which the thumbnail of the item will be generated. "Thumb" is the path to the thumbnail image of the uploaded product. "Model" provides the relative path to the XML for the model. "Pattern" is the default design file converted to XML. "Sizes" defines the available product sizes. "Modelsize" defines the size represented on the 3D model. The "Templates" entry provides a list of the UV mapping arrangement available for this product. "Pallets" come from the product definitions. "Zoom" defines the distance of the product to the camera when loaded, to provide suitable viewing distance for differently sized models.

Once the model file is saved, the user interface 200 of the product design system 10 will display a thumbnail of the newly added product in the list of available products. When loading a model to preview a product in the user interface 200 of the product design system 10, an algorithm is used to adjust the texture coordinates, and minimize the unused area of created bitmap texture. It is to be understood that while the steps of the algorithm are described as occurring in a particular order, other orders may be used within the scope of the invention. The order provided in the foregoing description is merely exemplary.

In an exemplary algorithm, for each mesh of the model of the product, a corresponding pattern component is found. If it doesn't exist, the mesh represents an uncustomizable component of the product, and remains unaffected. Otherwise, the algorithm iterates through all vertices of each face of the mesh, and for their texture coordinates u and v, determines corresponding minimum and maximum values minU, maxU, minV, maxV. The algorithm then iterates through each vertex of the sewing line of the pattern component, and for their position coordinates x and y determines corresponding minimum and maximum values minX, maxX, minY, maxY.

A scaling factor f is determined by the formula f=max (maxX−minX, maxY−minY)/max (maxU−minU, maxV−minV). The algorithm iterates through all vertices of each face of the mesh again, and adjusts their texture coordinates u and v, adding to u a value of (minX/f)−minU and adding to v a value of (minY/f)−minV.

The algorithm then creates and stores a uniformly scaling matrix "scmt" with the scaling factor equal to the ratio of the default texture size to default printing resolution multiplied by f. This matrix scmt allows a direct transformation from the printing components space to the texture space, and after texture coordinates adjustment it uses the full available width and height of the texture bitmap.

Once the product is loaded in the product design system 10, at least one template is created. The template describes the way the artboard 210 is applied to a specific product of a specific size, and includes any distortion applied to the artwork in order to accommodate arched seams, etc. The template is created using the Template Editor 300, as described above. Using the Template Editor 300, the position, rotation and scale of the image are adjusted on each piece of the pattern. The 3D Preview view 220 acts as a visual guide to provide precise feedback of the resulting template.

Figure 7:
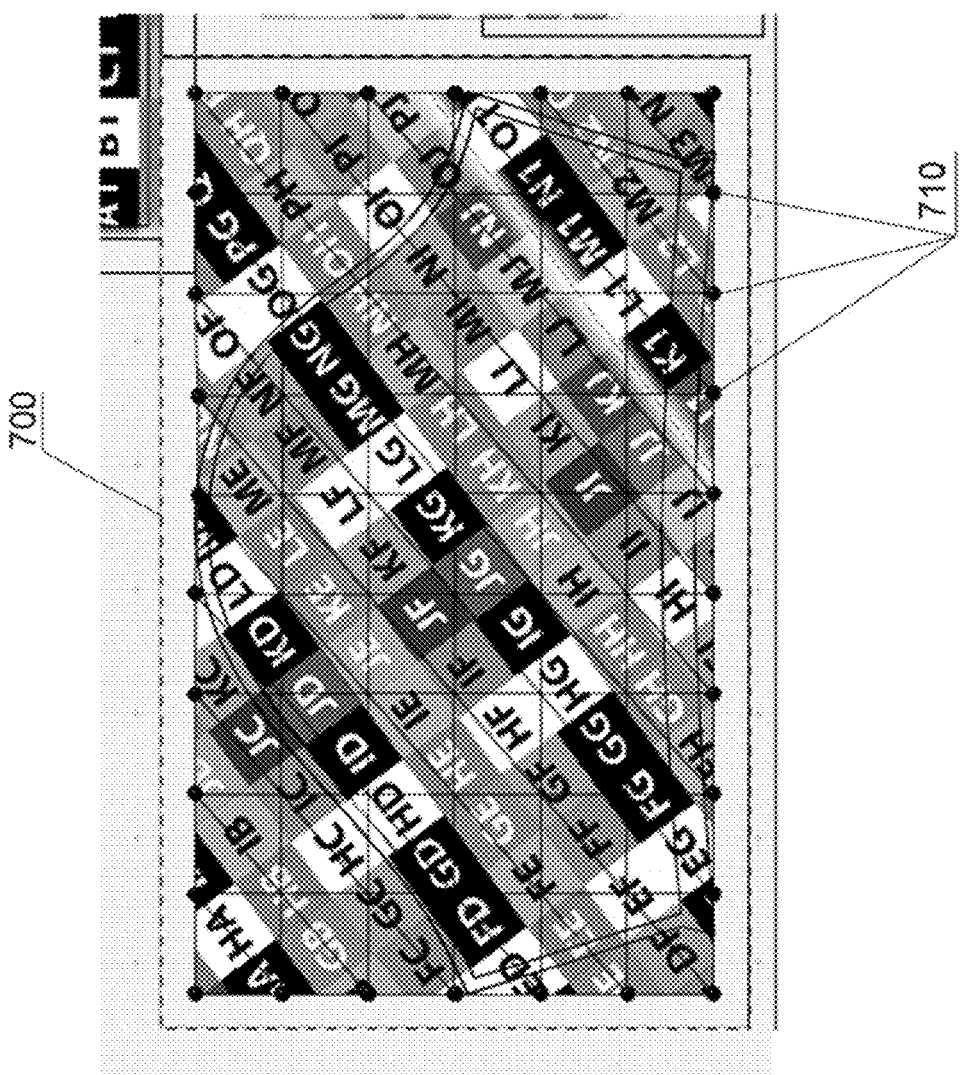
FIG. 7 is an illustration of an exemplary distortion grid in its default state according to preferred embodiments of the present invention.

Many types of garments (e.g., shirts) contain quite complex geometry. Seams may not be straight, and therefore it is difficult or impossible to align a graphic on either side of a seam. Referring to FIG. 7, a distortion modifier user interface 700 of the product design system 10 allows for aligning such graphics. In one embodiment, the distortion modifier user interface 700 provides a grid of points 710 that can be manually adjusted, either individually or as an entire grid. There are 3 main operations of the distortion modifier user interface 700:

1. Moving points in the X and/or Y coordinates;
2. Scaling the entire grid of points; and
3. Moving the entire grid of points.

The distortion modifier user interface 700 utilizes a verlet particle routine to find the most even spacing of the grid points 710. Therefore, when scaling the entire grid, it is preferable to use a corner point, as using any other point can create an "unsolvable matrix." The grid points 710 of FIG. 7 are in their default state. The perimeter points of the grid points 710 are made up of fixed points, while the remaining points are calculated automatically when an anchor point is moved.

Figure 8:
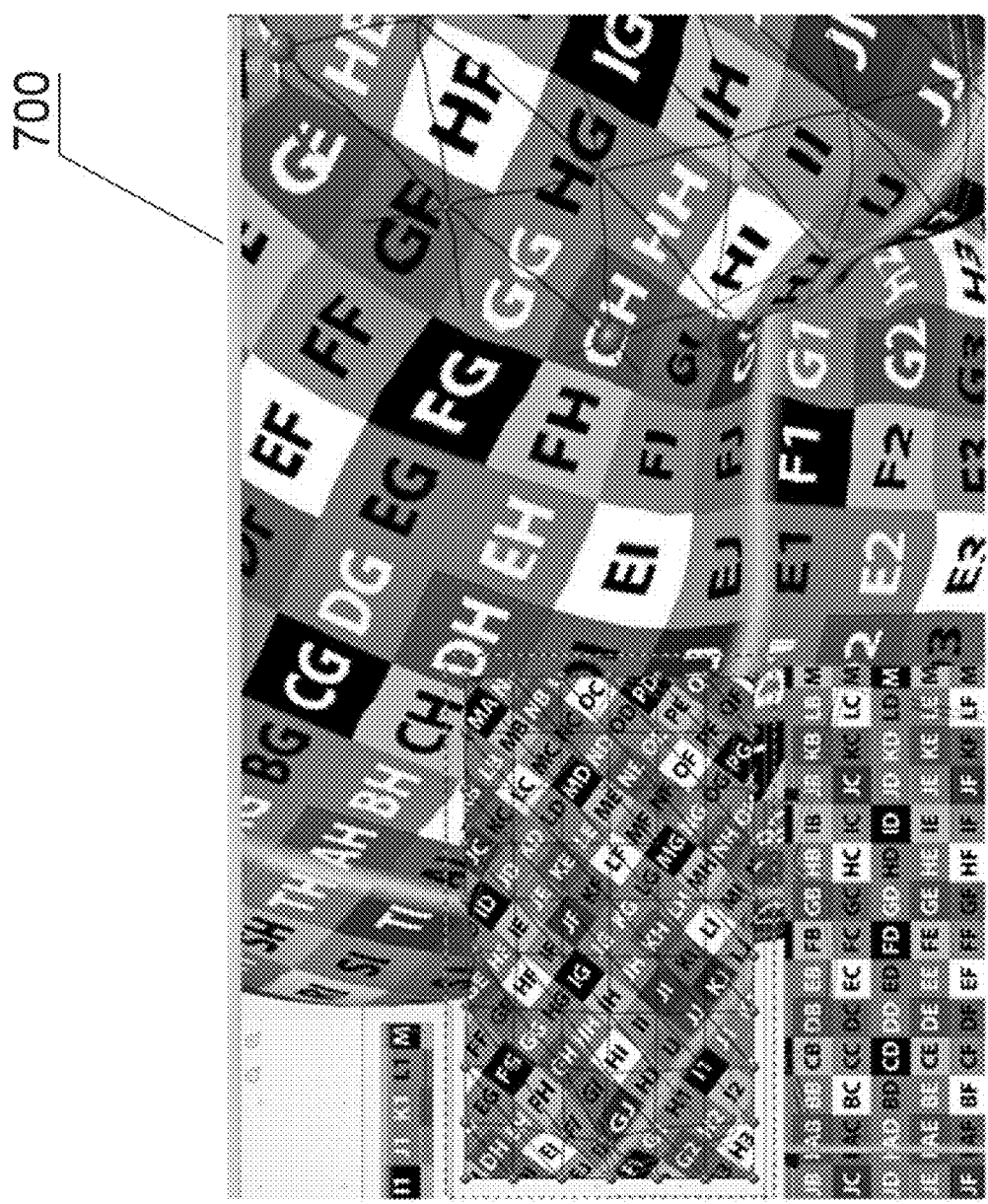
FIG. 8 is an illustration of the exemplary distortion grid of FIG. 7 having a shirt sleeve with a small amount of distortion applied thereto.

FIG. 8 is the exemplary distortion modifier user interface 700 of FIG. 7 illustrating a shirtsleeve with small amount of distortion applied. Notice grid squares GF, GG, GH and GI are more aligned than with no distortion present.

Figure 9:
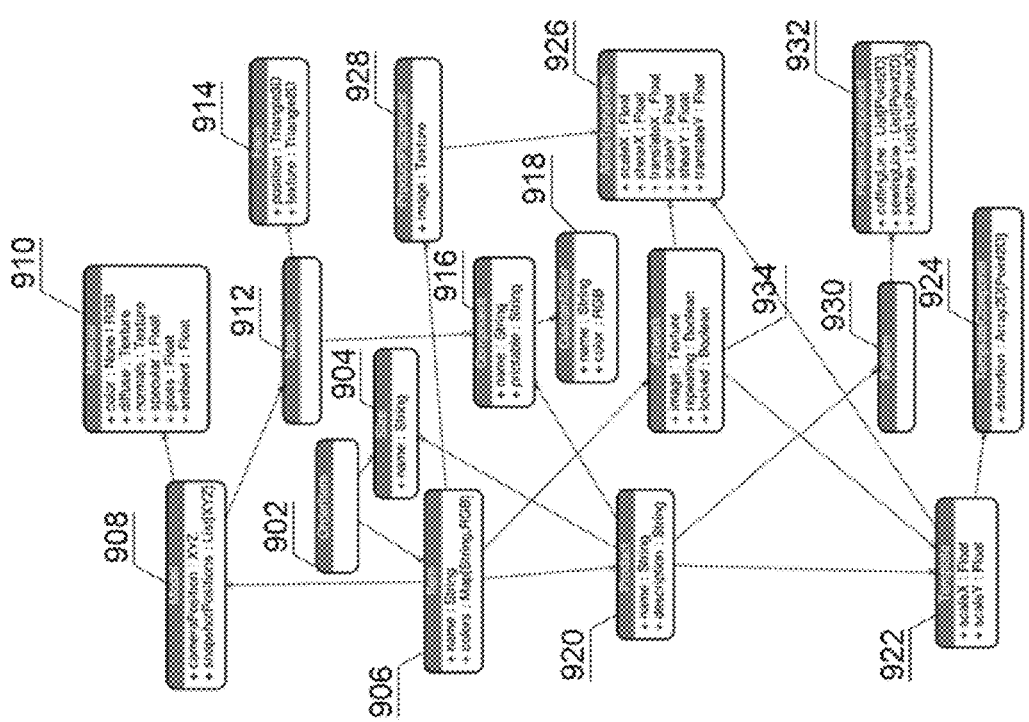

FIG. 9 is an entity relationship diagram of the entities of a product according to a preferred embodiment of the invention. The major entity is OrderItem 902. Additional entities include Size 904, Item 906, Model 908, Material 910, Mesh 912, Face 914, Component 916, CustomColor 918, Product 920, Template 922, TemplateComponent 924, AffineTransform 926, ProductPlacement 928, Pattern 930, PatternComponent 932, and Artwork 934. The entities of FIG. 9 will now be described in further detail.

The product entity 920 specifies a general kind of items the product design system 10 is capable of designing (e.g., t-shirt, backpack, laptop sleeve). Products are characterized by their name, description, a list of product components, a list of available product sizes (e.g., S, M, L, XL), and for each product size, a product pattern with a list of product templates, a product model, and a list of camera positions for generating snapshots. The description information (e.g., name, description, and list of components with their properties) of all the products is specified on the web server 20. The data server 30 preferably contains all other properties. An exemplary Product entity 920 is shown below:

```
entity Product {
    name : String
    description : String
    sizes : List[Size]
    components : List[Component]
    patterns : Map[Size,Pattern]
    templates : Map[Size,Map[String,Template]]
}
entity Size {
    name : String
}
```

The component entity 916 defines each separate part of a product, which can be printed and cut, or otherwise produced. Each component entity 916 has an unique name, and has one or more of the following properties: printable—which specifies if a texture can be printed on the components, or a solid color only; color—which can be either an arbitrary RGB color, or a color from the list of predefined custom colors.

An exemplary component entity 916 and CustomColor entity 918 is shown below:

```
entity Component {
    name : String
    printable : Boolean
    color : None | RGB | List[CustomColor]
}
entity CustomColor {
    name : String
    color : RGB
}
```

The pattern entity 930 defines a layout of how the product components defined by the component entity 916 are printed. For each product component of a product, a product pattern may have at least one cutting line specified. A cutting line is a non-self-intersecting closed polygonal chain on the plane. The cutting line represents a path for cutting the component piece from bulk of the material after printing. If the cutting line is specified for a component, then a sewing line can also be specified. The sewing line represents an area of the component piece visible after the product was sewn, it is a non-self-intersecting closed polygonal chain fully contained within the same component's cutting line. If the sewing line is not specified in the product pattern, it is assumed to be equal to the cutting line. If a cutting line is specified for a component, then a list of notches can also be specified. Each notch is a polygonal chain representing a marking or a hint on the material outside the component piece's visible area, designed to help a sewing operator to combine the component pieces together. An exemplary pattern entity 930 and PatternComponent entity 932 is shown below:

```
entity Pattern {
    components : Map[String,PatternComponent]
}
entity PatternComponent {
    cuttingLine : List[Point2D]
    sewingLine : List[Point2D]
    notches : List[List[Point2D]]
}
```

If it is feasible for a texture to span across several components, a product may define a number of templates that govern how the texture flows between the components utilizing the template entity 922. Each product template entity 922 has a list of product component entities 924 it allows to combine. For each of the template components 924 involved, product template 922 defines one or more mappings from the plane to the component area. Each mapping is defined as a composition of an affine mapping, and a distortion mapping. A distortion mapping is a partial mapping from a plane to plane, and is defined by a rectangle grid of points on a plane with the dimensions of m×n, m>1, n>1. For each i in [0 ... m−1] and j in [0 ... n−1] a distortion mapping transforms any point from the triangle <i/(m−1),j/(n−1)); (i/(m−1),(j+1)/(m−1); (i+1)/(m−1),j/(m−1)> with an affine transform that would map that triangle to the triangle <a[i,j]; a[i,j+1]; a[i+1,j]>, and any point from the triangle <(i+1)/(m−1),(j+1)/(n−1); i/(m−1),(j+1)/(m−1); (i+1)/(m−1),j/(m−1)> with an affine transform that would map that triangle to the triangle <a[i,j]; a[i,j+1]; a[i+1,j]>. The distortion mapping is undefined for all other points. Each product template 922 has also two scaling factors set for X- and Y-axes, which are applied to textures marked for aspect ratio preservation before applying a mapping to them. An exemplary template entity 922 and TemplateComponent entity 924 is shown below:

```
entity Template {
    components : Map[String,TemplateComponent]
    scaleX : Float
    scaleY : Float
}
entity TemplateComponent {
    placement : List[AffineTransform]
    distortion : List[List[Point2D]]
}
```

The artwork entity 934 defines a bitmap loaded into the product design system 10 with the purpose of being used in the design of a product as separate image or as a repeating visual pattern. An item entity 906 defines a customized version of a product, created by assigning a color to each of the product components, a texture pattern possibly filling each of the product components, with an affine transform from the plane of the bitmap into the area of the cutting line interior of the corresponding product pattern component, and a list of artworks appearing on the item, with their placement. Each artwork's placement has a reference to the artwork bitmap used, a flag stating if it is a repeating pattern or a single image instance, a reference to the product template used, an affine transform from the plane of the bitmap to the plane of the corresponding template input, and a flag stating if the artwork aspect ratio should be preserved across all of the sizes of the template. An exemplary item entity 906, PatternPlacement entity 932, and Artwork entity 934 are shown below:

```
entity Item {
    product : Product
    colors : Map[String,RGB]
    patternFills : Map[String,PatternPlacement]
    artworks : List[Artwork]
}
entity PatternPlacement {
    image : Texture
    transform : AffineTransform
}
entity Artwork {
    image : Texture
    repeating : Boolean
    transform : AffineTransform
    template : String
    masked: List[String]
    locked : Boolean
}
```

An ordered item entity 902 defines an item together with the product size specified. It contains all the information necessary to materialize a product. An exemplary OrderItem entity 902 is shown below:

```
entity OrderItem {
    item : Item
    size : Size
}
```

A Product model entity 908 defines a set of 3D-meshes and materials used to display what an item might look like after it is produced. Meshes can be assigned names. For each product component, a mesh with the same name may exist. In this case, the area inside the sewing line of the product pattern for that product component is treated as a texture for the mesh. Alternatively, a mesh can be assigned a material, characterized by a color, diffuse and normal textures, and light reflecting values, indicating it represents an element of the product that is not customizable. An exemplary Model entity 908, Mesh entity 912, Face entity 914, and Material entity 910 are shown below:

```
entity Model {
    meshes : List[Mesh]
    cameraPosition : XYZ
    snapshotPositions : List[XYZ]
    materials : Map[String,Material]
}
entity Mesh {
    name : String
    faces : List[Face]
}
entity Face {
    position : Triangle3D
    texture : Triangle2D
}
entity Material {
    color : None | RGB
    diffuse : Texture
    normals : Texture
    specular : Float
    gloss : Float
    ambient : Float
}
```

The Affine transformation entity 926 defines a mapping of points from one coordinate space to another that can be produced from translation, rotation, scaling, and skewing of points, and shapes or curves defined by them. A transformation matrix preferably represents the Affine transformation [[a, b, tx], [c, d, ty], [0, 0, 1]]. The result of a transformation of point (x, y) is produced by multiplying a matrix by vector (x, y, 1), and discarding the last component of the result. In cases where no skewing is involved, the transformation can be represented by a tuple of (scaleX, scaleY, rotation, translationX, translationY). In cases where no skewing and uniform scale is involved, the transformation is represented by a tuple (scale, rotation, translationX, translationY).

Figure 10A:
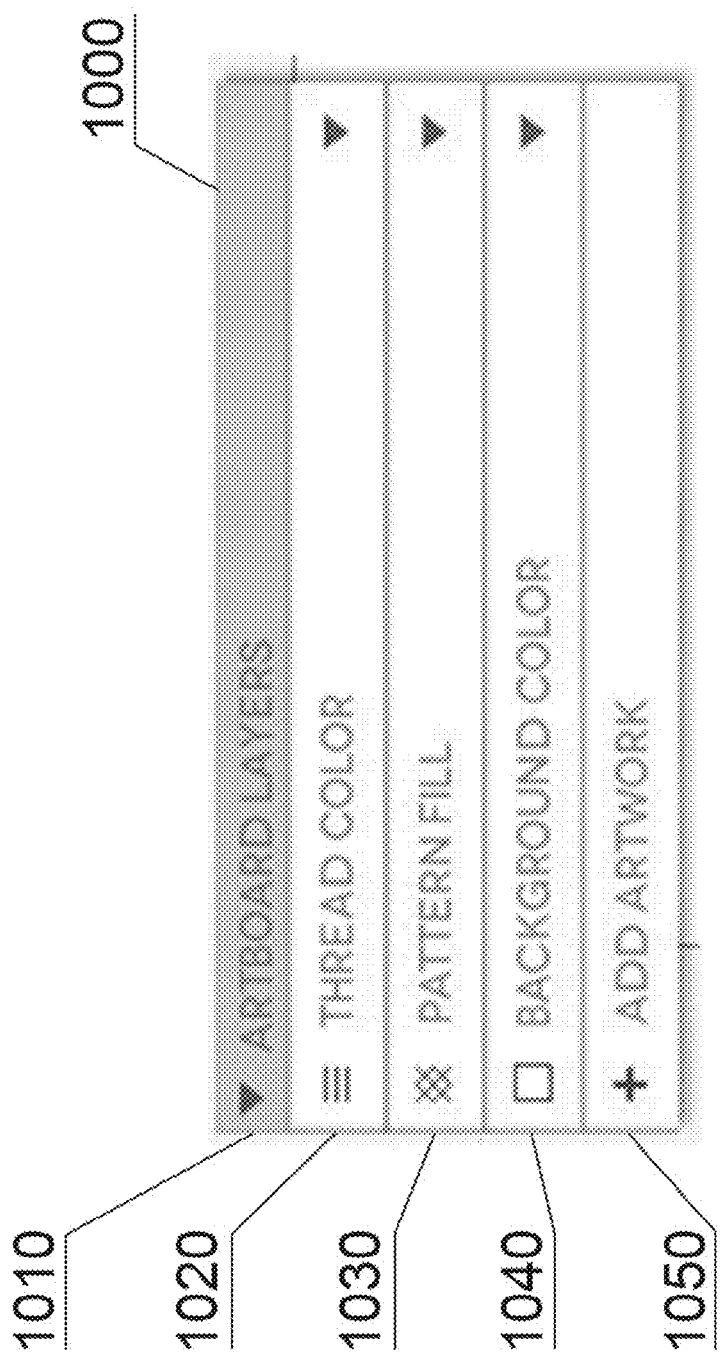
FIGS. 10a, 10b, and 11 are exemplary user interfaces of an artboard view according to the preferred embodiments of the present invention.

Referring to FIG. 10a, the user interface 1000 includes one or more editing tools that allow a user to modify the desired source image(s). A Layer tool 1010 allows the user to layer their art when there are multiple pieces of art loaded. With this tool, users can move layers of art up and down in a layer hierarchy. A Thread color selection tool 1020 allows a user to select a thread color to be used for sewing the product together. When the location of the thread is externally visible in a view of the 3D model, the 3D model preferably displays the selected thread color.

Figure 27:
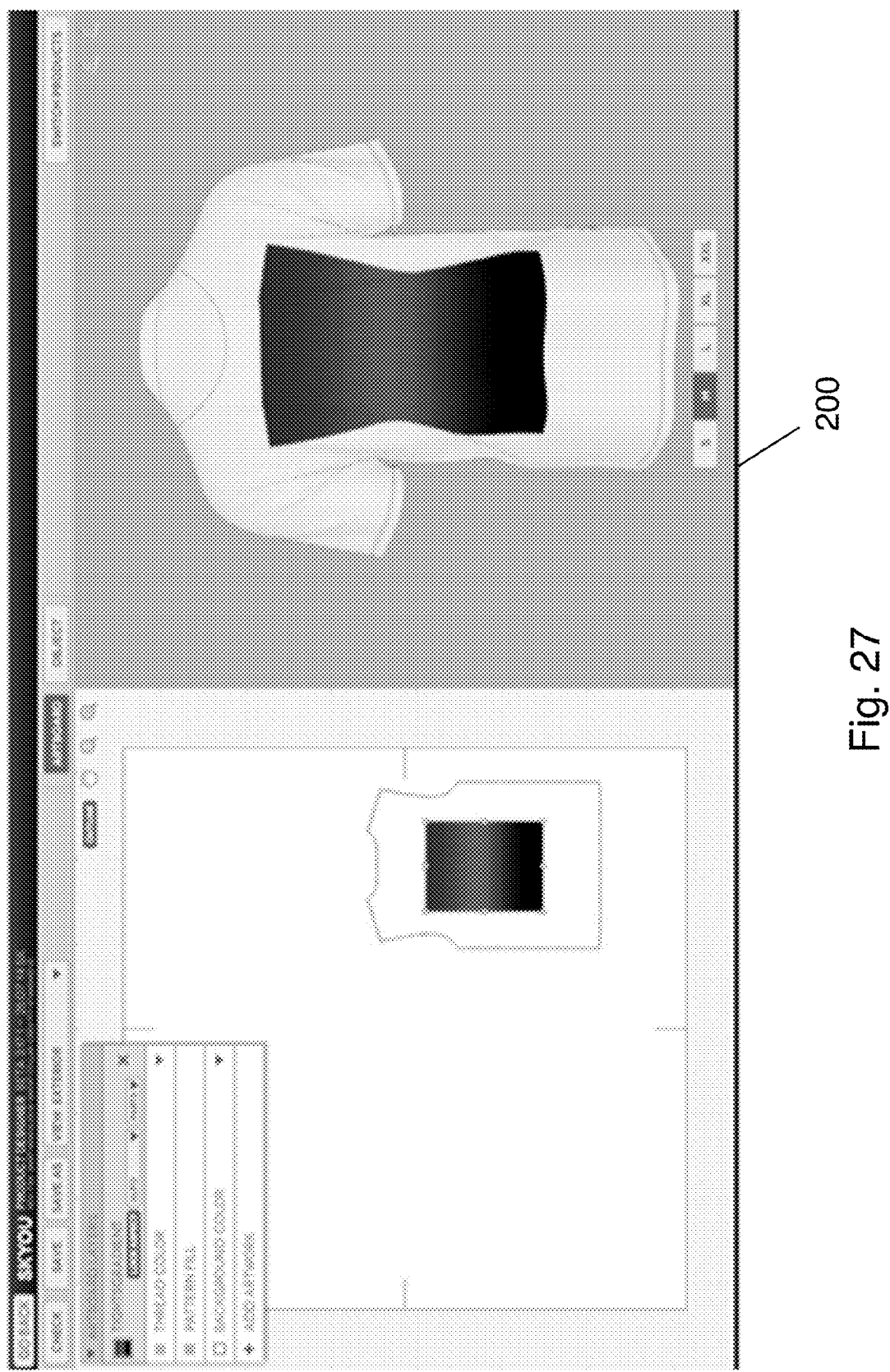
Figure 28:
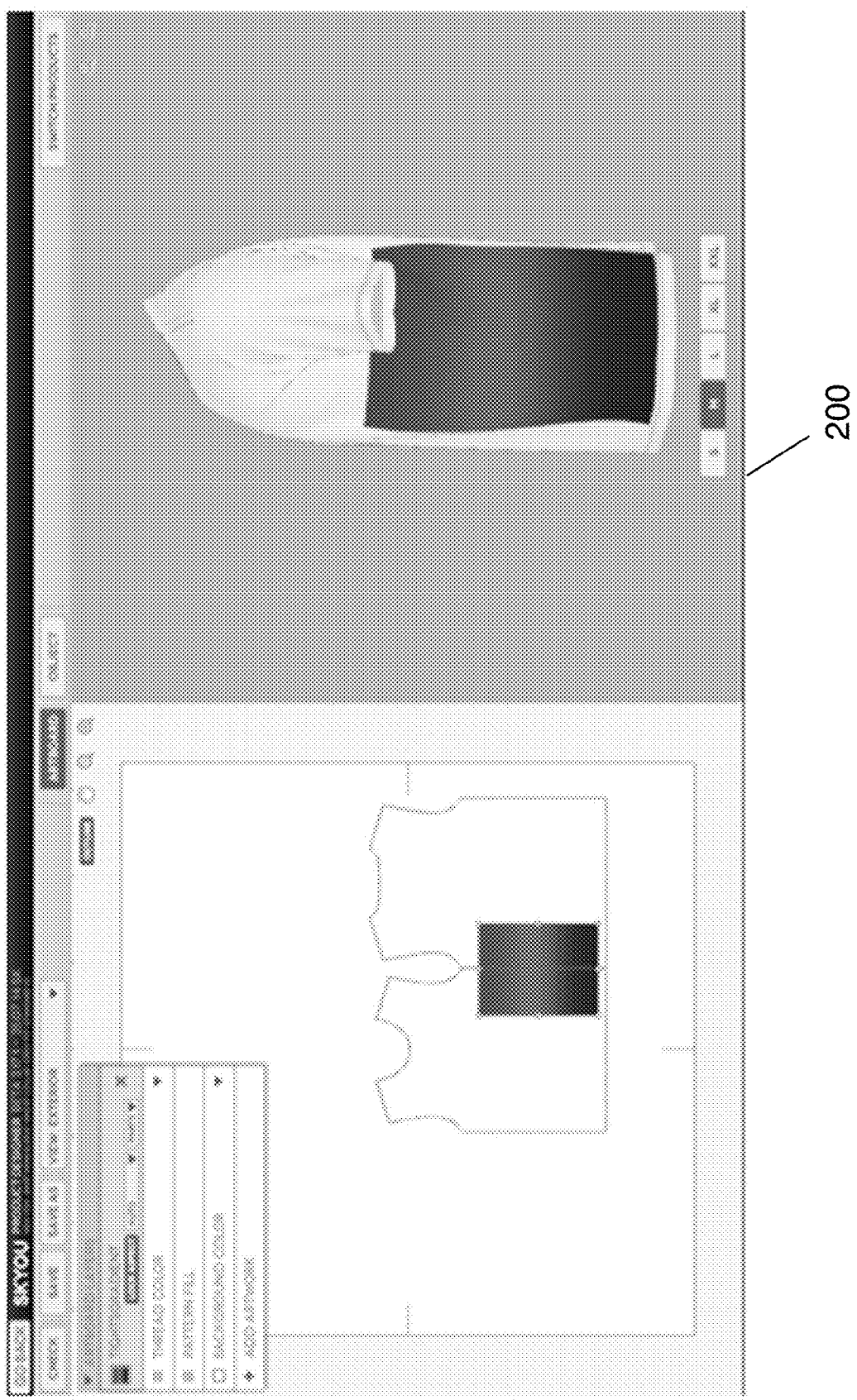

A Pattern fill selection tool 1030 allows the user to fill the entire product with an image of their choice. Once an image is selected, it can be scaled, rotated, masked on an individual part(s), and moved around on the product, the way the image is wrapped across the seam can be selected. The default wrapping template is the "auto" template, which depending on the location of artwork and size of the artwork on the 3d model will select the part(s) that the artwork is covering and only allow artwork on that given part(s). FIG. 27 illustrates an example where the auto template has selected the back of the shirt as the sole part based on the location of the artwork. Furthermore depending on the location of the artwork on the artboard, the design tool will also select the best wrapping template that corresponds to the location of that art. FIG. 28 illustrates an example where the auto template has selected the "right" wrapping template based on the location of the artwork. These selections are made algorithmically by selecting the part(s) and template that are most covered by the artwork. This feature helps artist quickly and intuitively add art to only the parts they want. This feature can be overridden by selecting the desired wrapping template using the wrapping template menu dropdown, and the desired parts using parts mode.

Returning to FIG. 10a, a Background color selection tool 1040 allows the user to select a background color for the product via a color picker. Preferably, changes performed using the editing tools 1000 are reflected in the source image displayed on the artboard 210 and/or the 3D Preview view 220. An Add artwork selection tool 1050 allows the user to add artwork for use on a desired product.

Figure 10B:
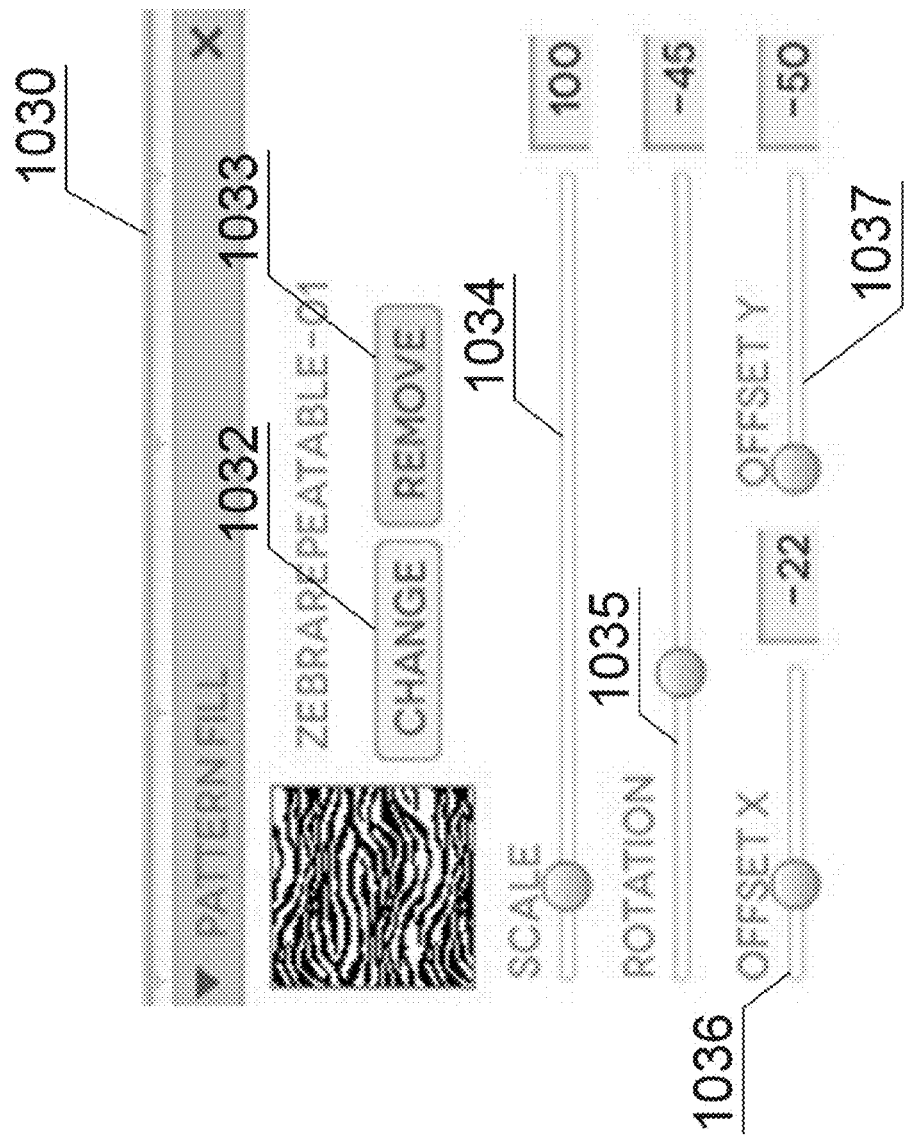

Referring to FIG. 10b, the pattern fill selection tool 1030 includes a Pattern Fill Palette feature that allows the user to adjust the scale, rotation, and position of their selected pattern. The Change feature 1032 allows the user to change the image used as the pattern. The Remove feature 1033 removes the existing pattern. The Scale feature 1034 is preferably a slider scale that allows the user to scale the image larger or smaller when forming a pattern. The Rotation feature 1035 is a slider scale that allows the pattern image to be rotated. The Offset X feature 1036 is a slider scale that allows the user to move the image left and right on the 3D model, while the Offset Y feature 1037 moves the image up and down on the 3D model. These actions can also take place directly on the artboard 210.

For products with multiple sizes (e.g., t-shirts), users must make a design decision based on how they would like their graphic to be scaled on the desired product. Users can elect to lock the aspect ratio of their art on each garment size. If the aspect ratio is locked the graphic expands or contracts at a percentage equal to the largest dimensional change of the product be it vertically or horizontally, while maintaining its original aspect ratio. If the aspect ratio is not locked, the art will be stretched to fill the same approximate area on each garment size. Another option instead of stretching the artwork is to repeat the artwork on the product, so that the same image appears on the garment more than once. This option tiles an image across the artboard 210, allowing the user to adjust the scale of the image, and to rotate it by adjusting the appearance of the image on the artboard 210.

Preferably, when users are designing a product interface using the user interface 200, they are designing for a particular size. In one preferred embodiment, the product being designed is always a size medium, therefore a medium size garment will be manufactured closest to what is shown in the 3D Preview view 220. When the design is applied to other sizes, the desired artwork is scaled to fit the desired product size. Therefore, if the user creates an image that takes up 50% of the length and width of the shirt, the product design system 10 maintains this 50% coverage of length and width on all sizes. However, there is a tradeoff in this scenario, as each size of a particular garment (e.g., t-shirt) typically does not scale proportionately. For example, depending on the type of garment being designed, when stepping from a size medium to a size large, the length of the garment might increase, while the width stays the same.

In contrast, when stepping between a size large and a size XL, the width might increase, while the length stays the same. That is, sizes of garments frequently do not increase proportionately. Due to this disproportionality, images can become stretched depending on what size product the customer orders. Image stretching can cause shapes displayed on them to become distorted. For example, circles in a design can become ovals, and squares can become rectangles to maintain the 50% coverage of length and width. When aspect ratio lock is turned on, a users' art will stretch only proportionally. It will remain in the same aspect ratio in which the user uploaded it. In the above example, the square would maintain a one-to-one aspect ratio. The image would then increase by the largest dimensional change between sizes. For instance, if between a "medium" and a "large," the length of the garment increases by 10% and the width increases by 15%, the user's image would increase in size by 15%.

Because of this smart scaling the placement and size of artwork may change slightly between sizes. The artist is therefore preferably presented with a 3D model for each size that allows him or her to view and rotate the product in all axes. The artist can make adjustments on the artboard and any change is immediately reflected on the 3D model FIG. 220.

Figure 21:
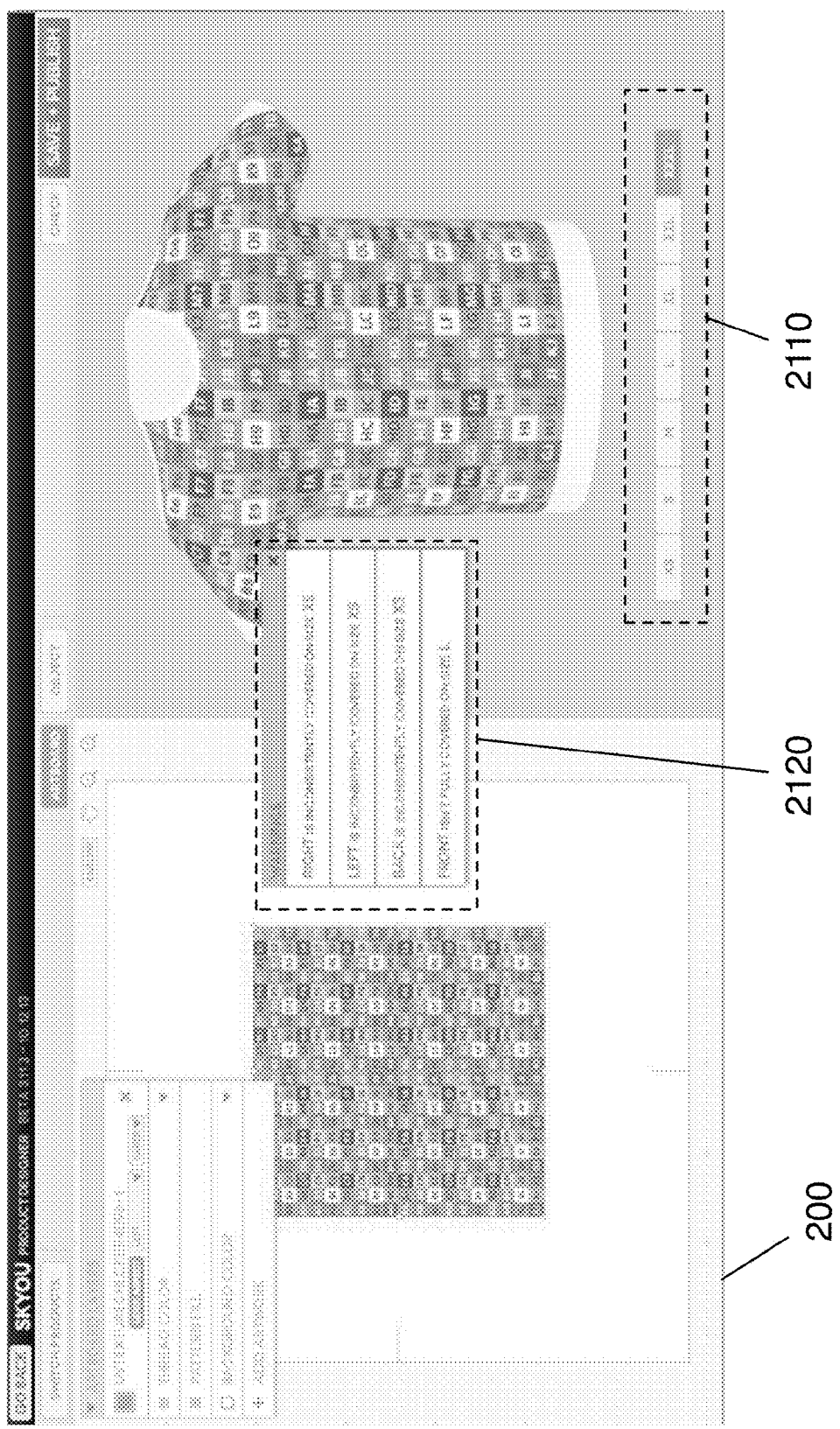
FIG. 21 is an exemplary user interface of the product design tool of FIG. 1a showing the presentation of warnings regarding coverage of the product with imagery.

As illustrated in FIG. 21, in addition to being able to view all sizes 2110, users may be presented with alerts 2120 that warn them of poor coverage of art. When an artist covers an entire product with art, that art will sometimes not cover all sizes due to the non-proportional nature of size scaling in products. The system will algorithmically check each size to ensure there is coverage. It will then find the most offending size and alert the user by creating a list of pattern pieces that have warnings.

Figure 22:
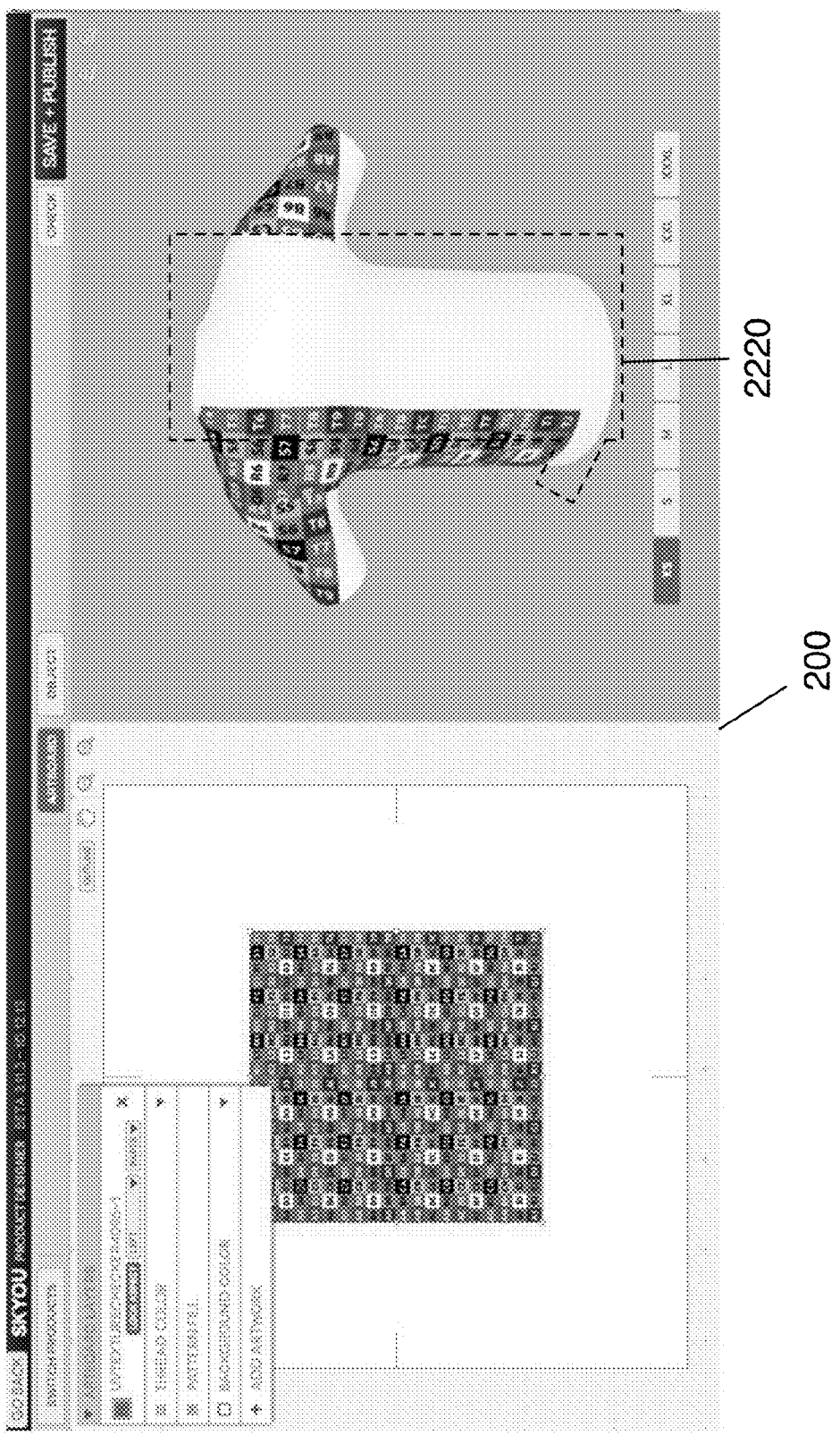
FIGS. 22-23 are exemplary user interfaces of the product design tool of FIG. 1a showing a three-dimensional model of a product rotated to expose a coverage issue.
Figure 23:
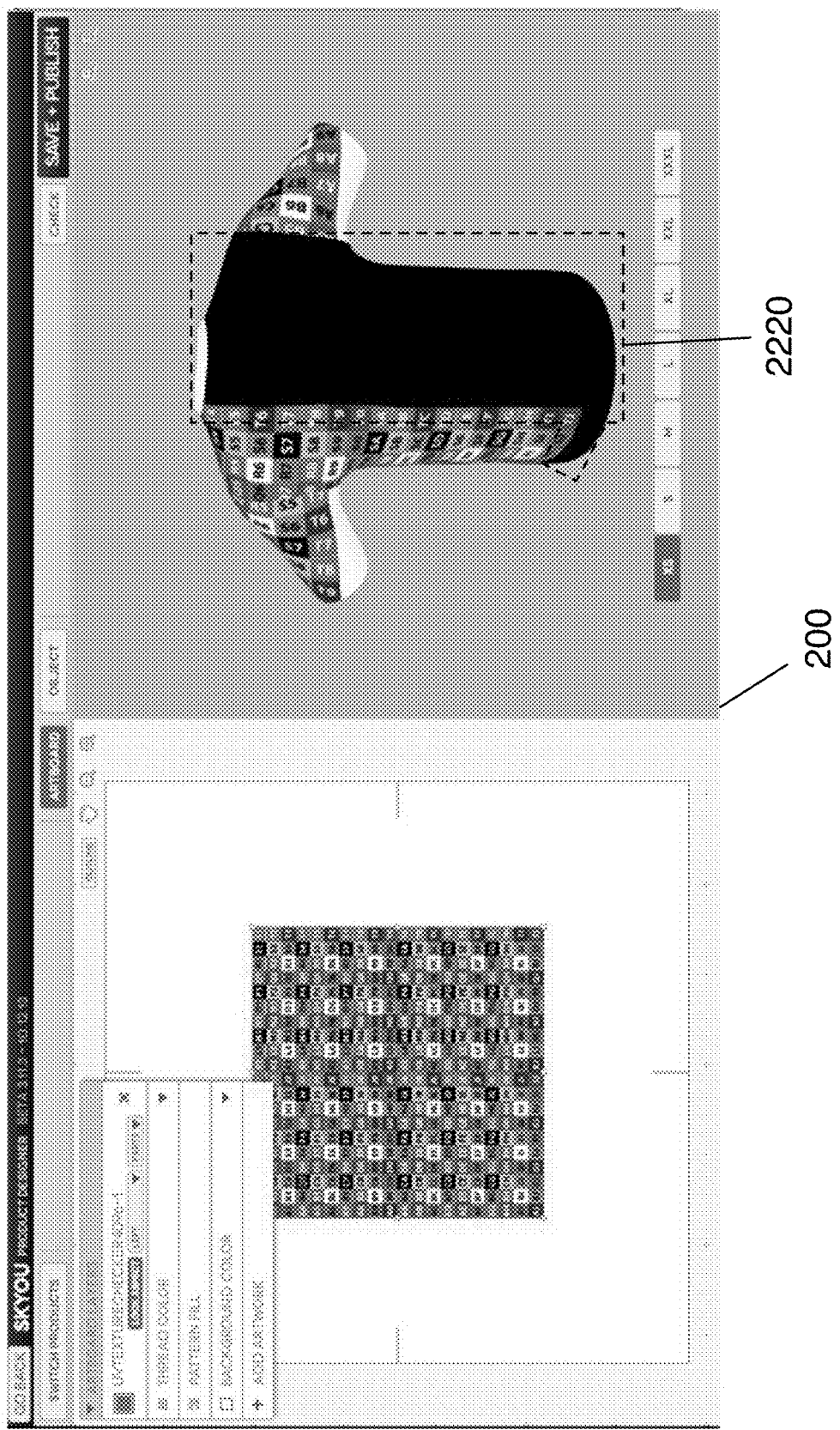

The user can then click on a given alert 2120, which turns the 3D model to the area of missing coverage 2210 of FIG. 22 and blinks on the non covered area FIG. 23. This allows the artist to view where the warning is, correct it by moving or scaling art on the artboard, or acknowledge the missing artwork and publish the product as is. As each warning is fixed it will no longer show up in the warnings list.

Figure 11:
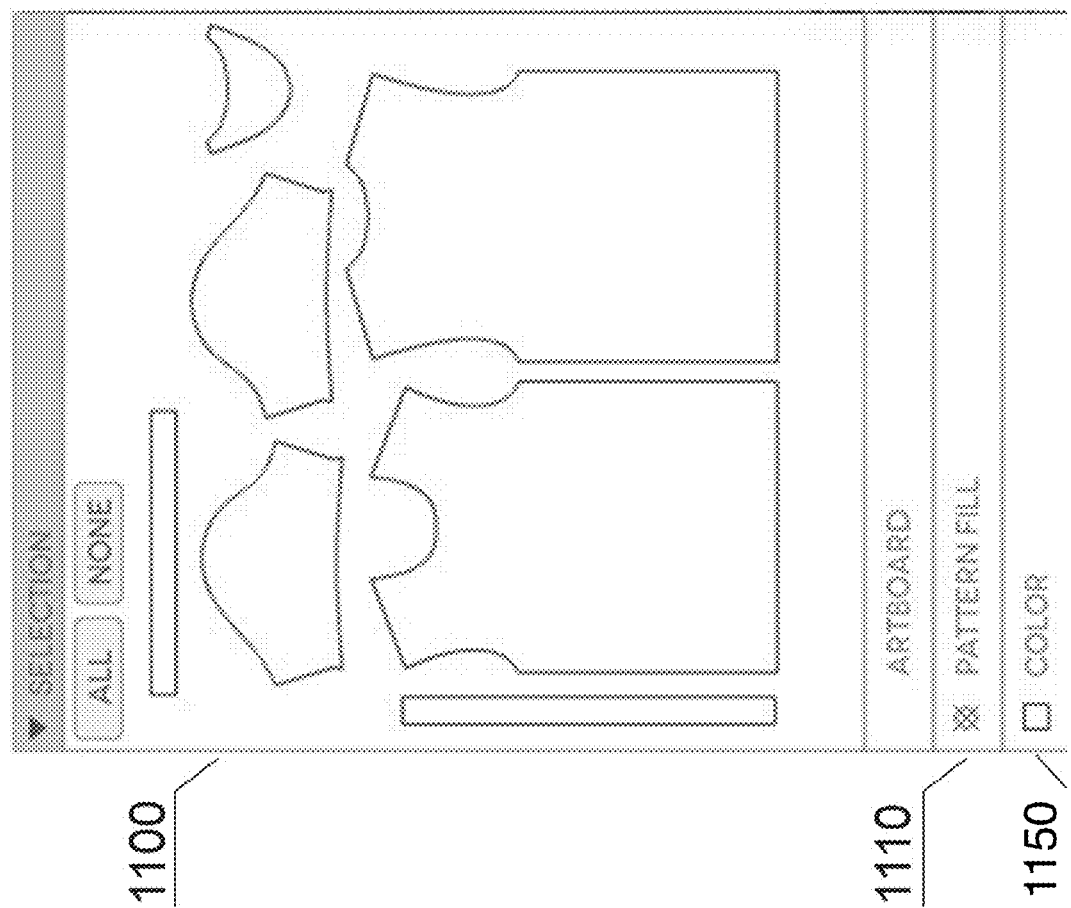
Figure 24:
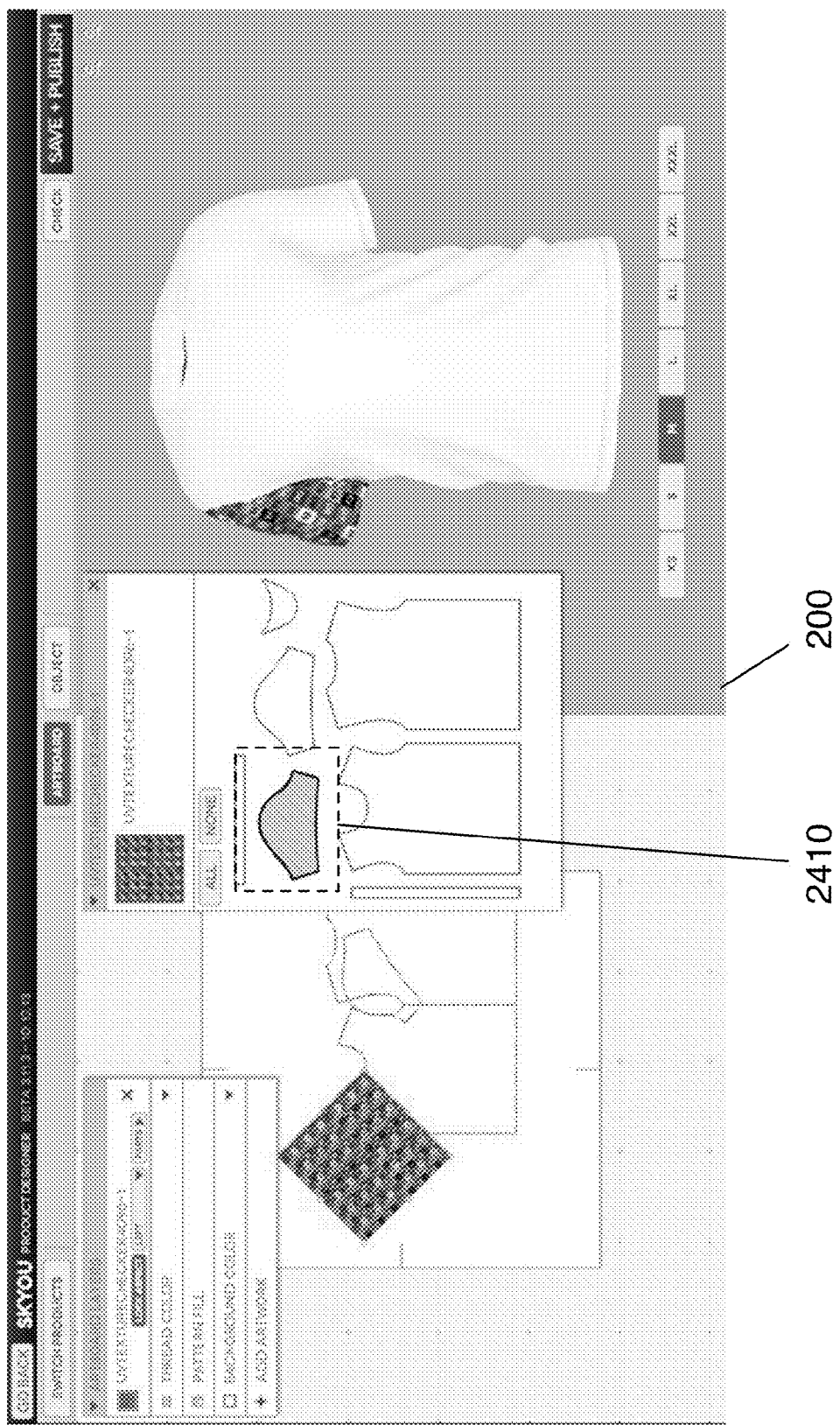
FIG. 24 is an exemplary user interface of the product design tool of FIG. 1a showing a selection of an individual component of a product.

As shown in FIG. 24, users can also add patterns, artwork, and background colors to individual components 2410 of the garment or object using an object tool 1100, or parts mode. Referring to FIG. 11, the object tool 1100 allows users to select a single component or multiple components of a garment or other object. Preferably, as users roll over a given component in the object tool 1100, it is highlighted on the 3D Preview view 220. One or more components 2410 can be selected simultaneously to add background color, user art, and/or patterns. A Pattern fill selection tool 1110 allows a user to add a repeating pattern to a component or multiple components. A Color selection 1120 allows a user to add a background color to a component or multiple components. User art can also be added to one or more components using the parts mode option. Parts mode can be used on each layer of artwork or pattern.

Figure 25:
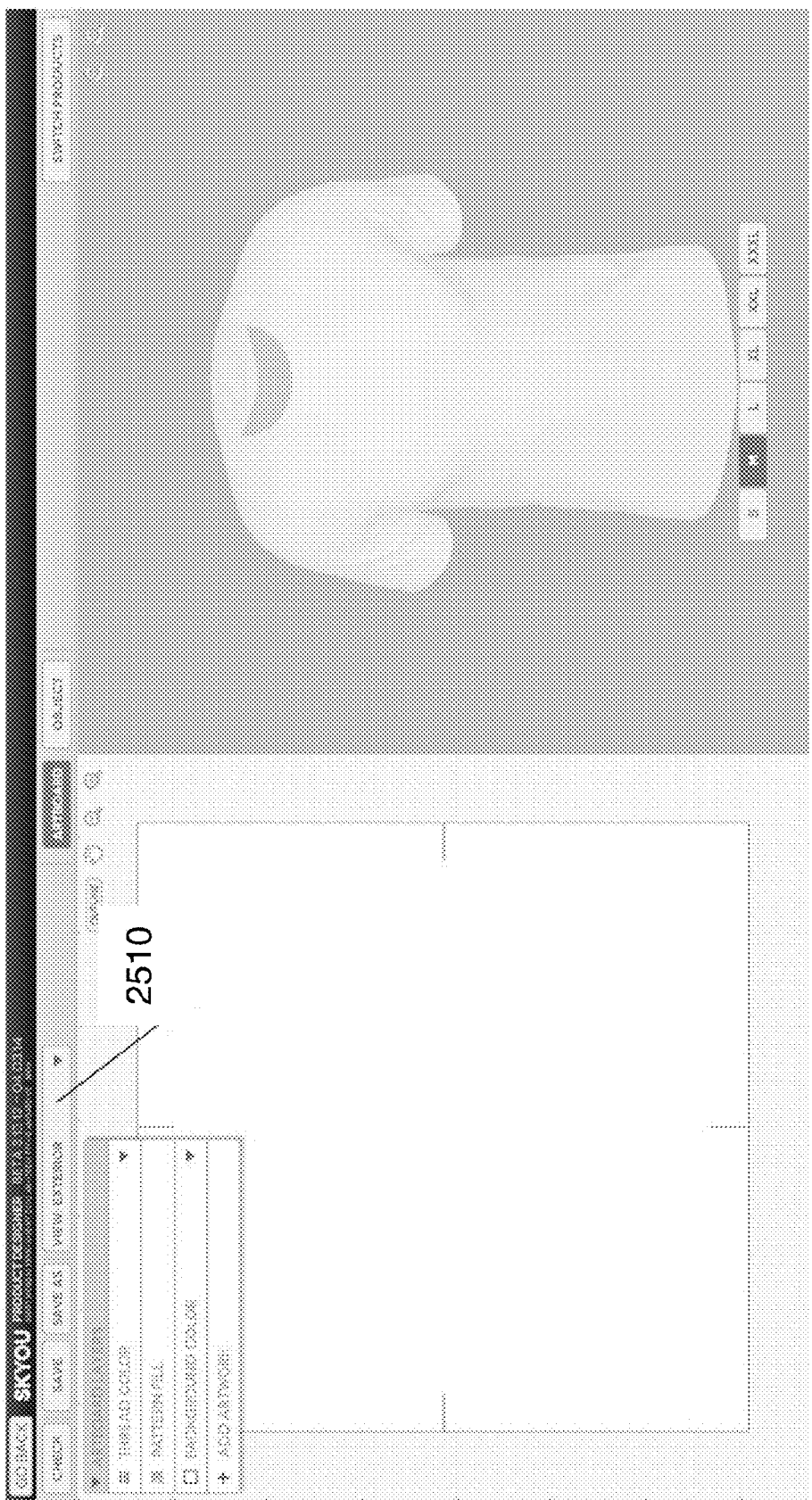
FIG. 25 is an exemplary user interface of the product design tool of FIG. 1a showing a pull-down menu for activating one or more alternative views of interior components that cannot be shown in the standard view of the 3D model.
Figure 26:
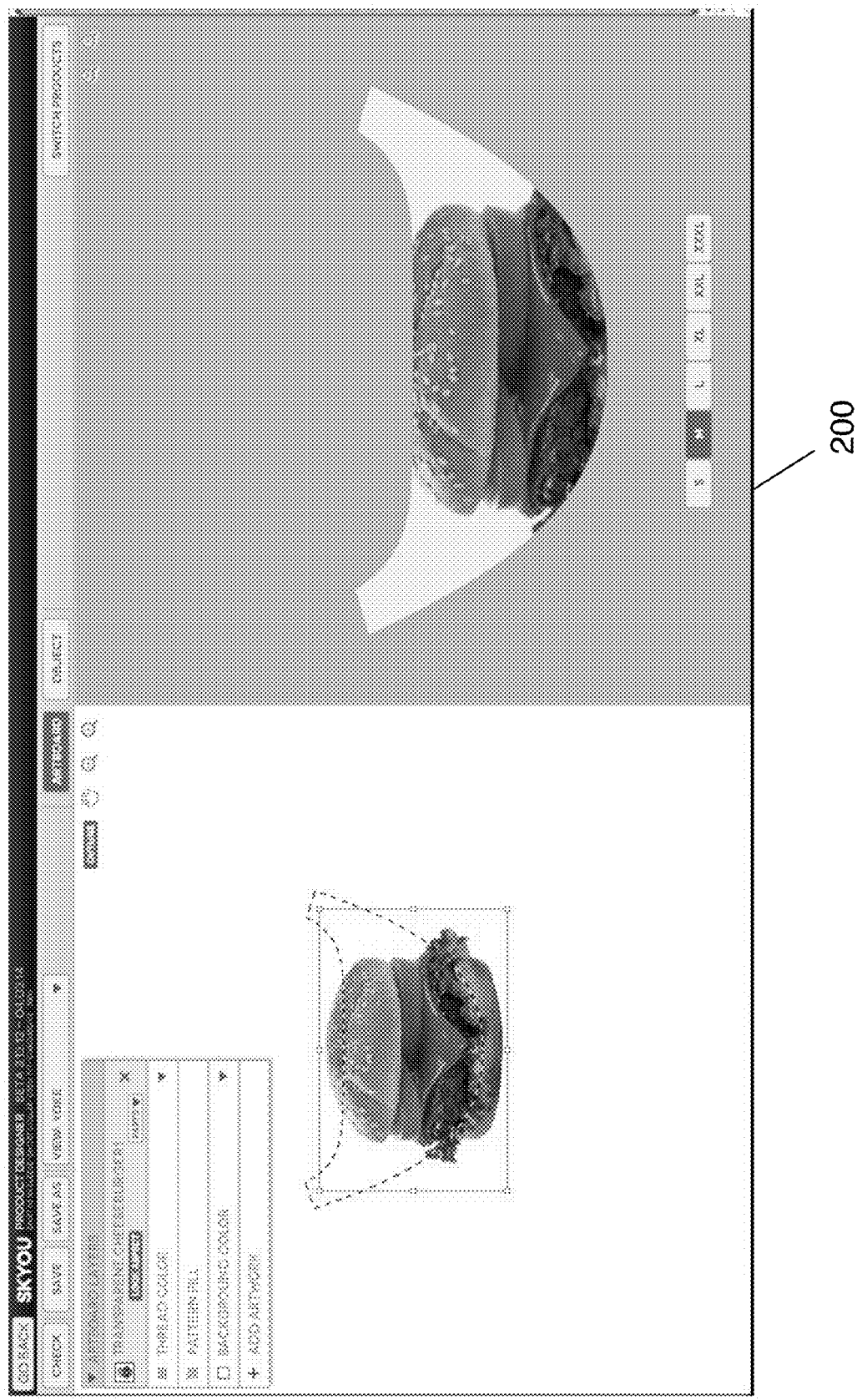
FIGS. 26-29 are exemplary user interfaces of the product design tool of FIG. 1a showing a user interface for selecting a size of a product for display.

As shown in FIG. 25, users are also presented with a drop down menu 2510 to activate one or more alternative views of interior components that cannot be shown in the standard view of the 3D model, for instance the interior of a bag, or the yoke of a t-shirt. This interior view works like the exterior view with an artboard area, a 3D model, and the ability to view each size FIG. 26.

Users can also create new products based on existing products quickly and easily by using the product families feature. The product families feature uses relationships between products to map artwork from one product to another. Based on a set of mapping inputs between two different products (e.g., men's and women's t-shirts) it will move and scale artwork to create a replica of the initial parent product as closely as possible onto the child product. It achieves this via a set of heuristic rules related to artwork location, mapping templates, and scale comparison between the parent and child product. This helps artists create many products via a single design, without having to design each product individually.

Figure 29:
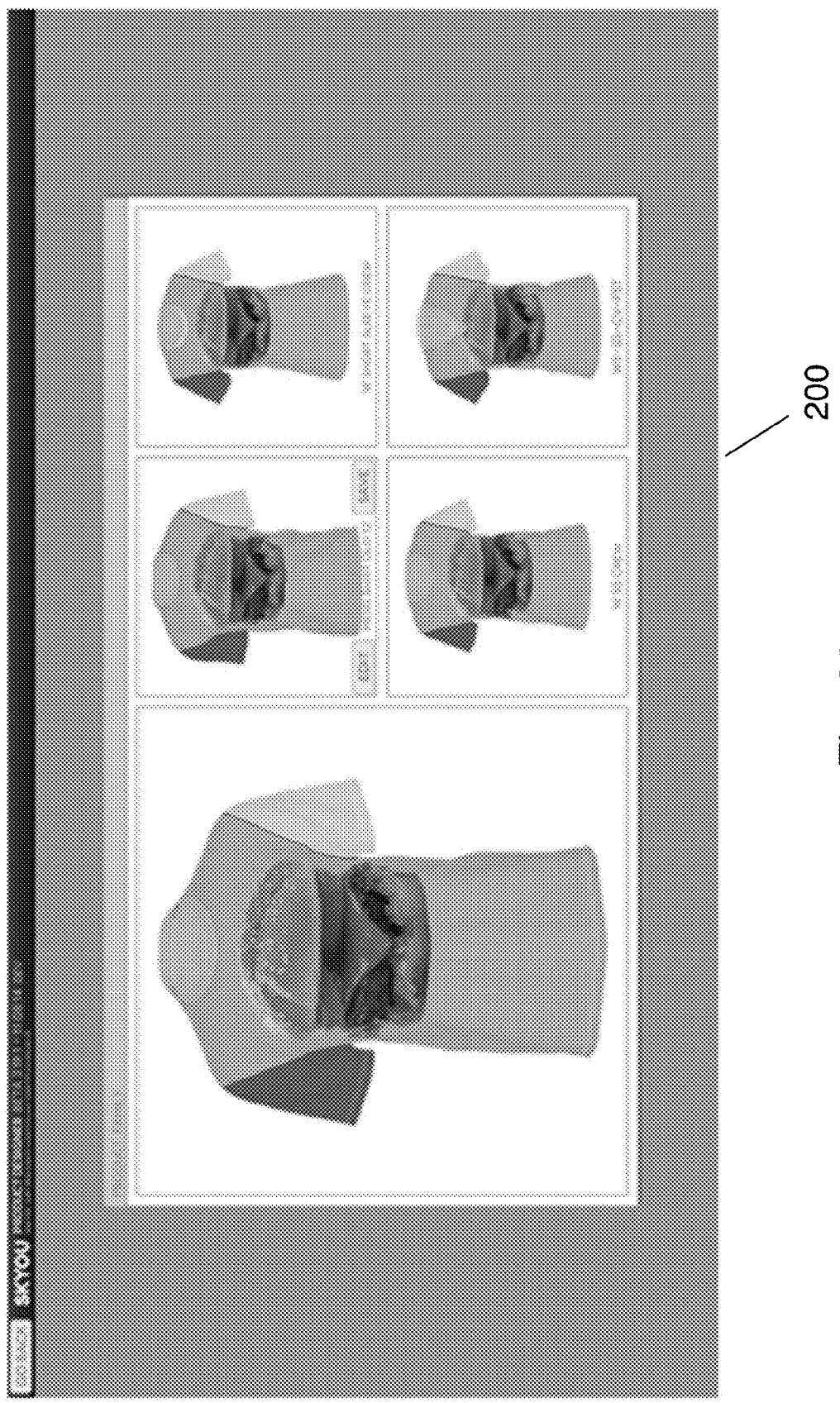

After saving a parent product, the artist is then presented with all the other products in the family with the artwork laid out by the product family logic. The artist can then choose to save or delete these products, or edit them further in the design tool FIG. 29. When an existing product's pattern is updated based on consumer feedback, this same logic can be used to map existing products to the updated pattern. The relationship between the products can be "linear" and enacted in either direction, meaning product A, B, or C can be considered the parent, and product A, B, or C can also be considered the child. If you were to start with product C and wanted to create product A, it would map to B, then to A. If you started with product C and wanted to create product B, it would map directly to B. Relationships can also be direct, such as A-to-C, A-to-B, B-to-C, B-to-A, C-to-B, or C-to-A. A combination of the two relationships, linear and direct is also possible. The best relationship is selected by observing the results of multiple tests, and then assigning a relationship. Relationships are stored in a database, so that when new products are added to the SKYOU platform we can message the artist to add these new products using the product families interface.

Figure 12:
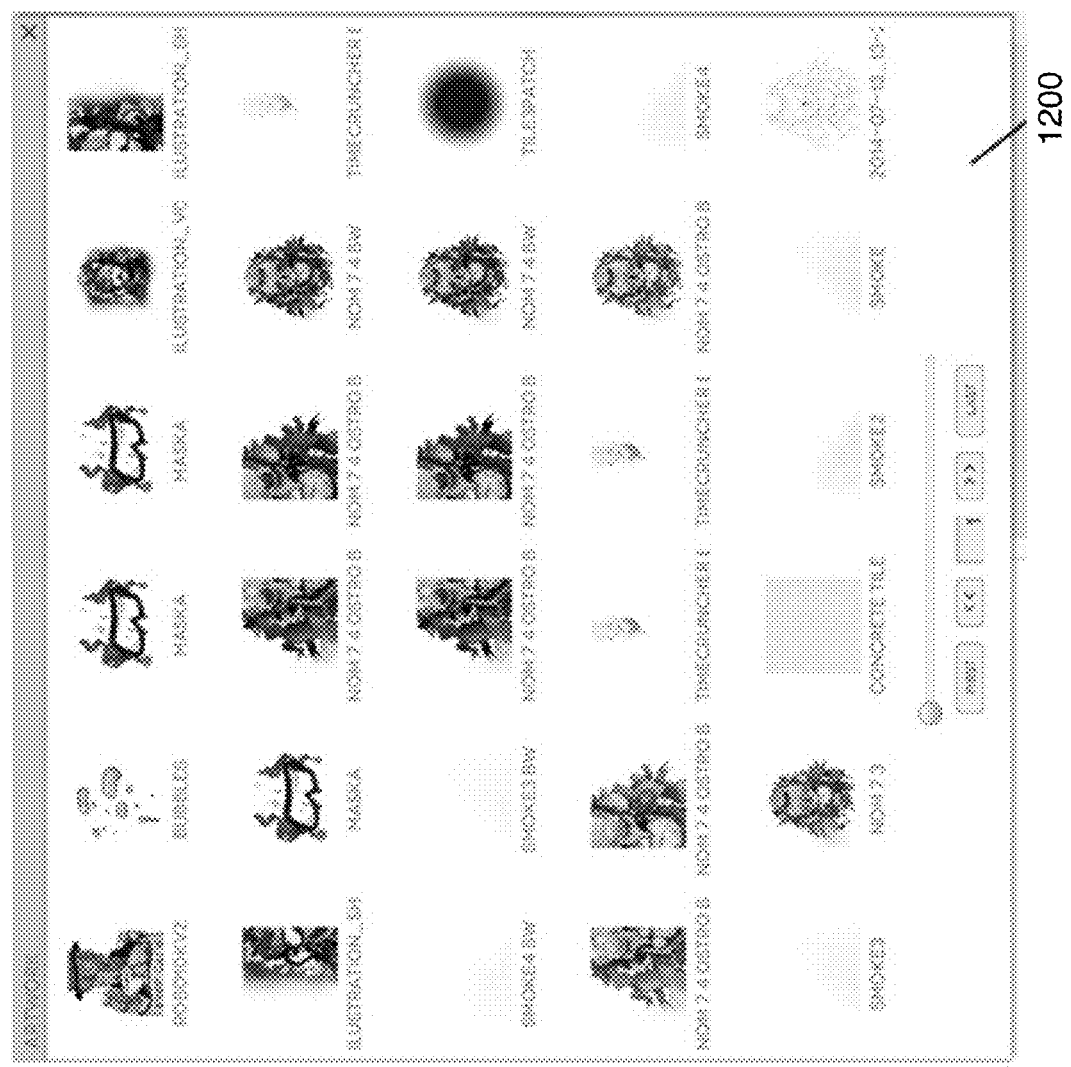
Figure 13A:
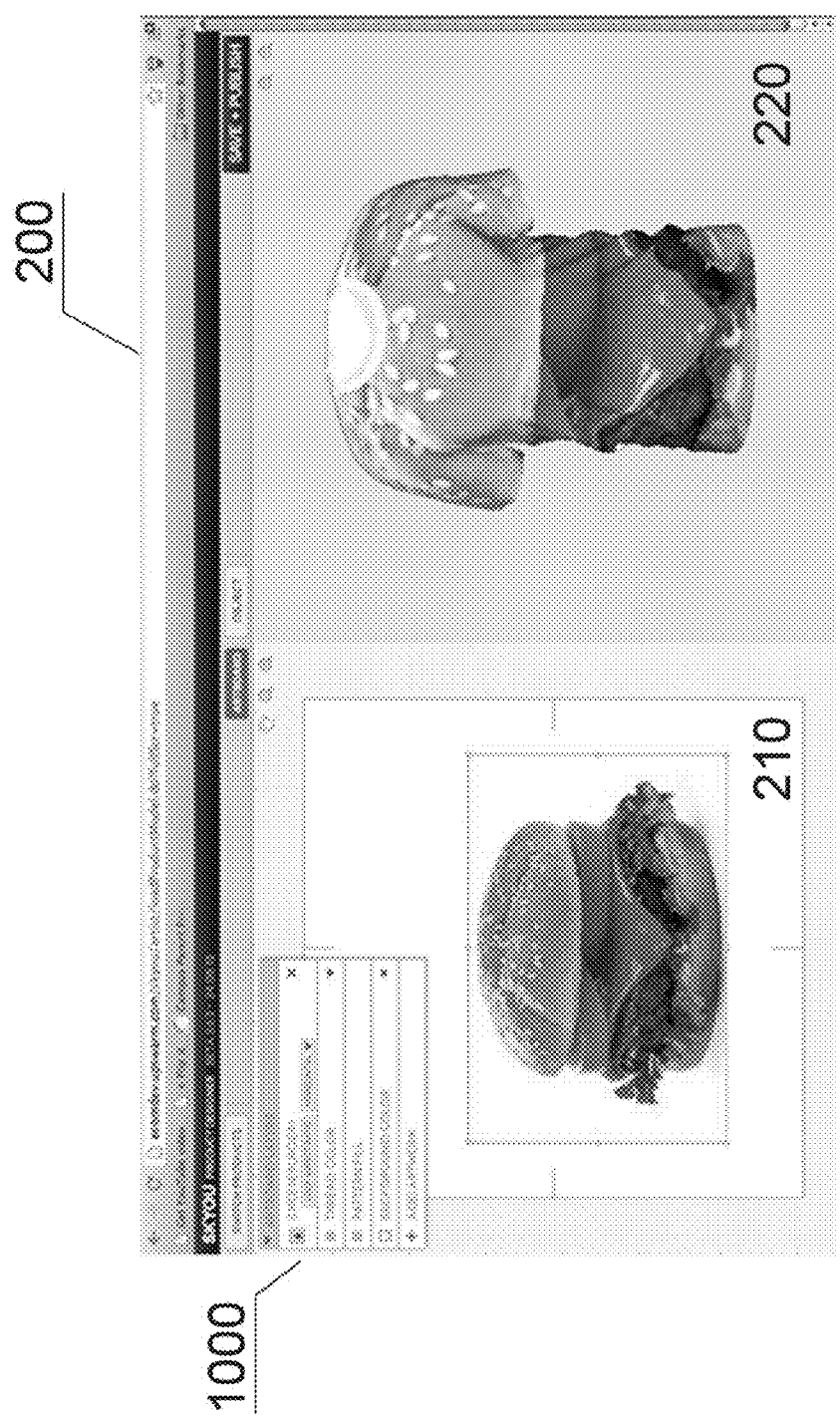
Figure 13B:
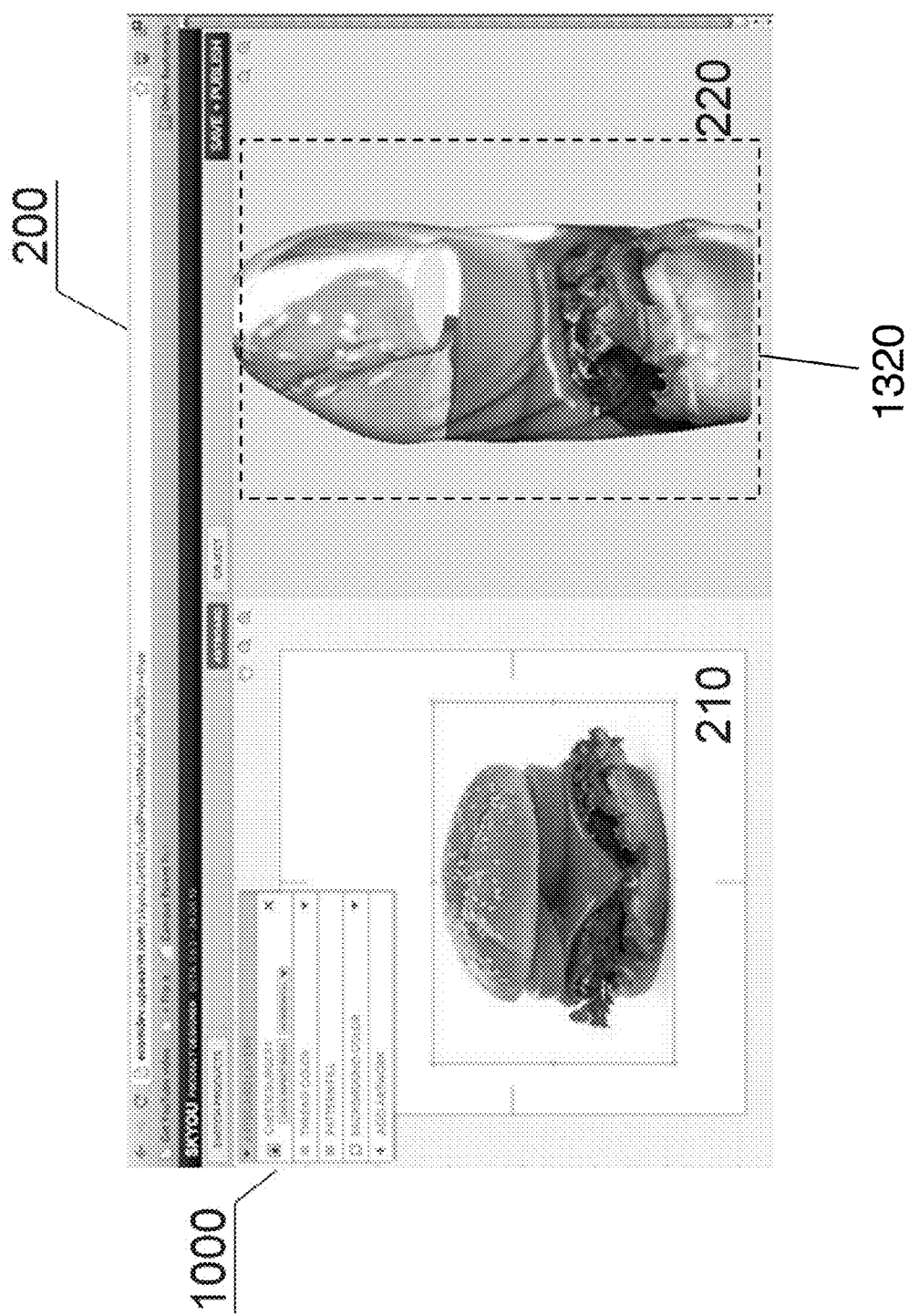

An exemplary process for creating a t-shirt using the product design system 10 will now be described with reference to FIGS. 12-17. As shown in FIG. 12, the user selects artwork to add to the product from an uploaded artwork library 1200, or another storage location. The user may then scale and place artwork in the artboard 210, as shown in the user interface of FIG. 13*a*. The artwork is visually represented on the object in the 3D Preview view 220. FIG. 13*b* illustrates the user interface of FIG. 13*a*, showing the alignment of the artwork as it wraps around the shirt model 1320, and across seams.

Figure 14:
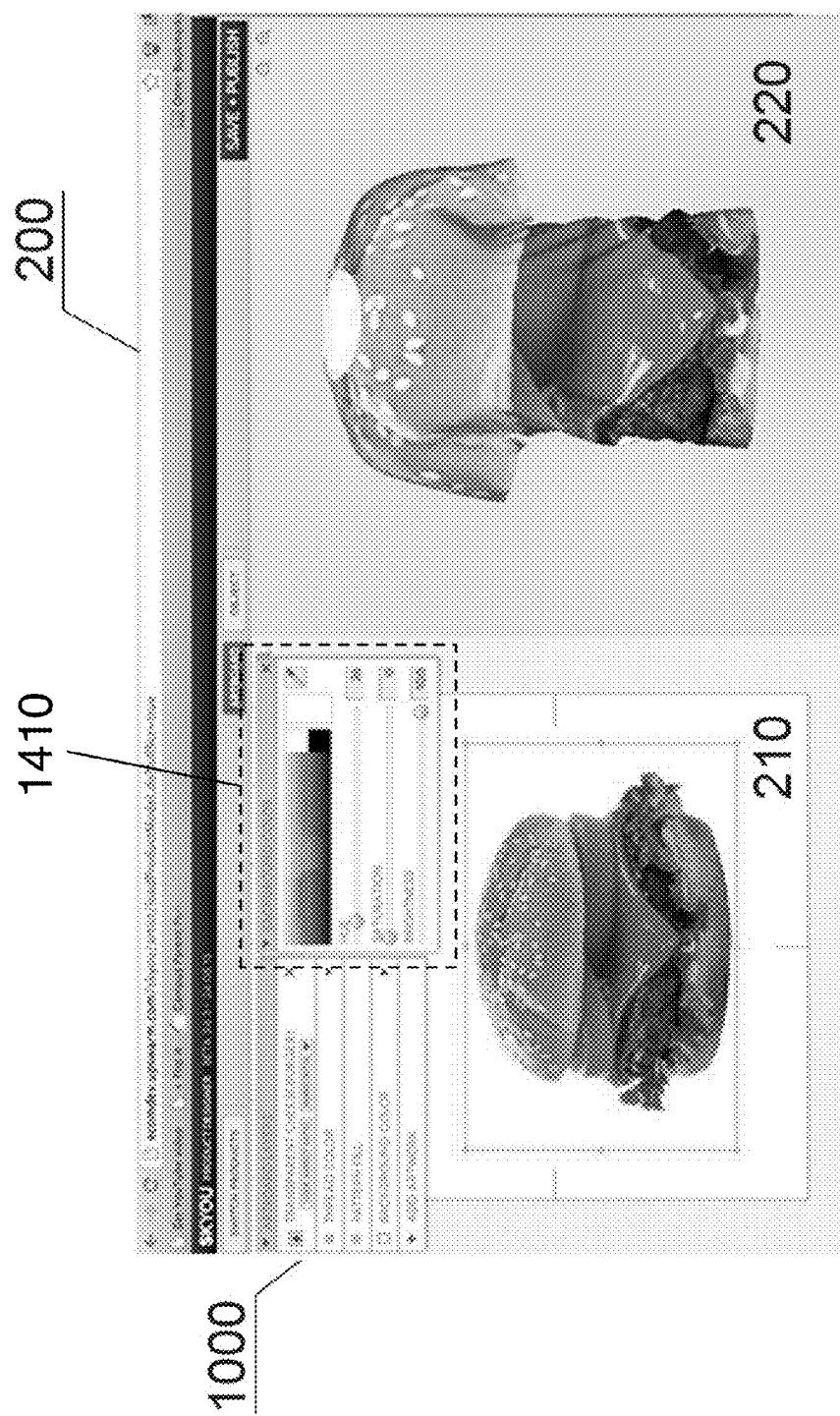
Figure 15:
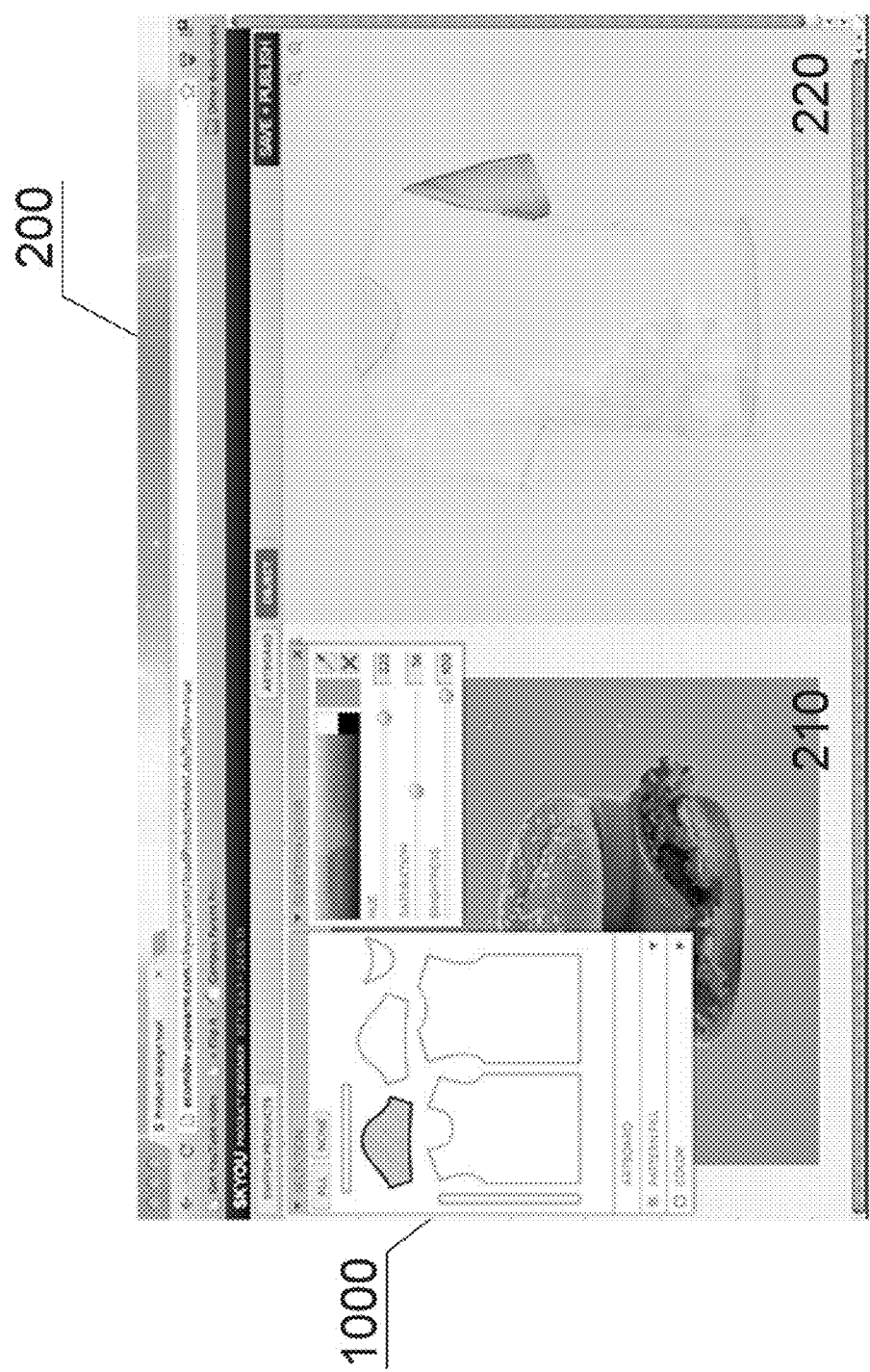
Figure 16:
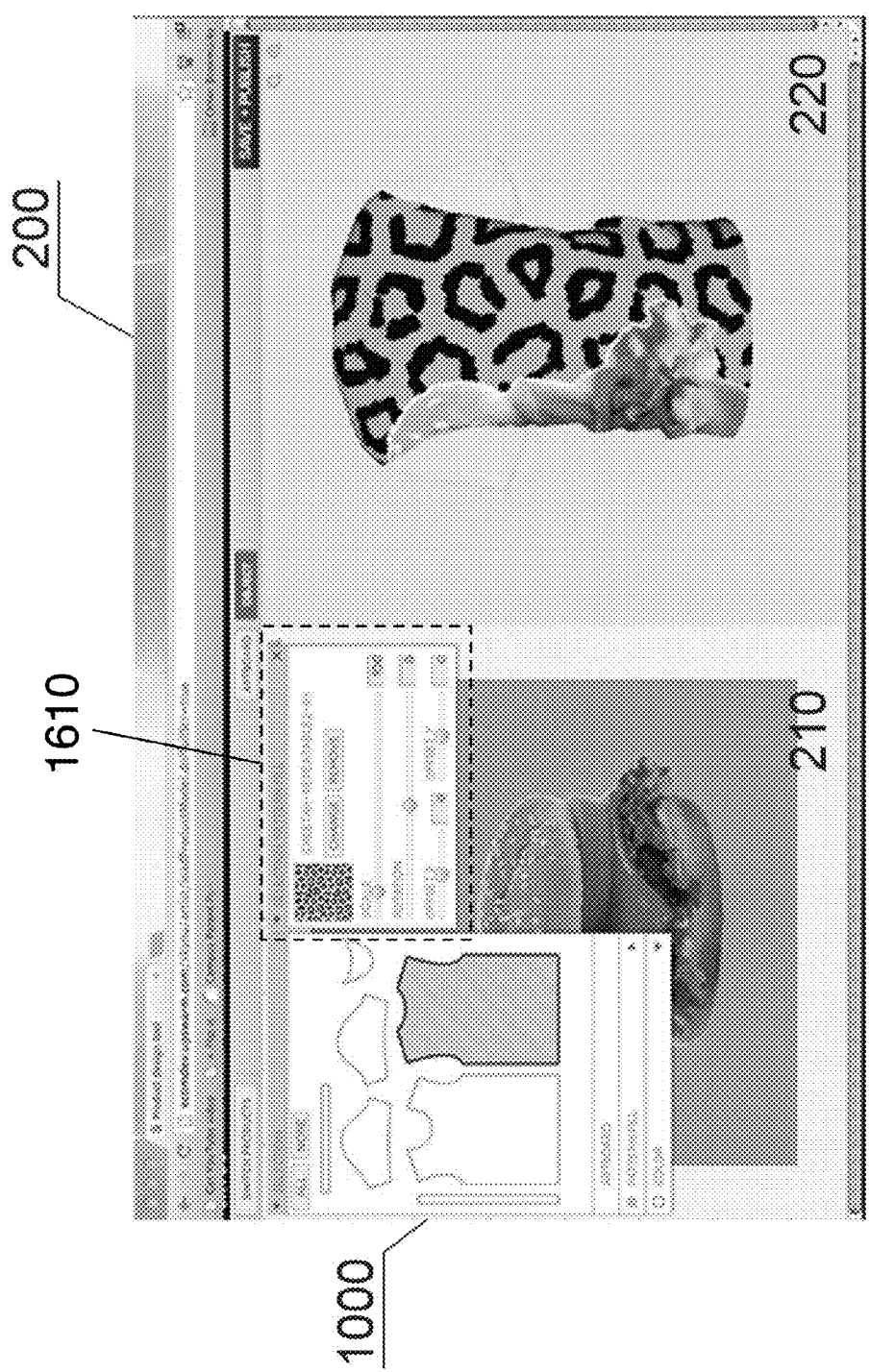

The user may then open the background color palette 1410 to add background color to the shirt, as shown in FIG. 14. Referring to FIG. 15, the user may also optionally enter Object mode to add color to one or more individual components, such as a sleeve, of the t-shirt. Referring to FIG. 21, the user may also optionally enter parts mode for a given art layer, to mask off art to a given piece or pieces of the product pattern such as the sleeve of the shirt. Finally, referring to FIG. 16, the user selects an image using dialog 1610 to pattern fill the back of the shirt, the pattern can be scaled, rotated, and moved using the selection pattern fill palette.

Figure 17:
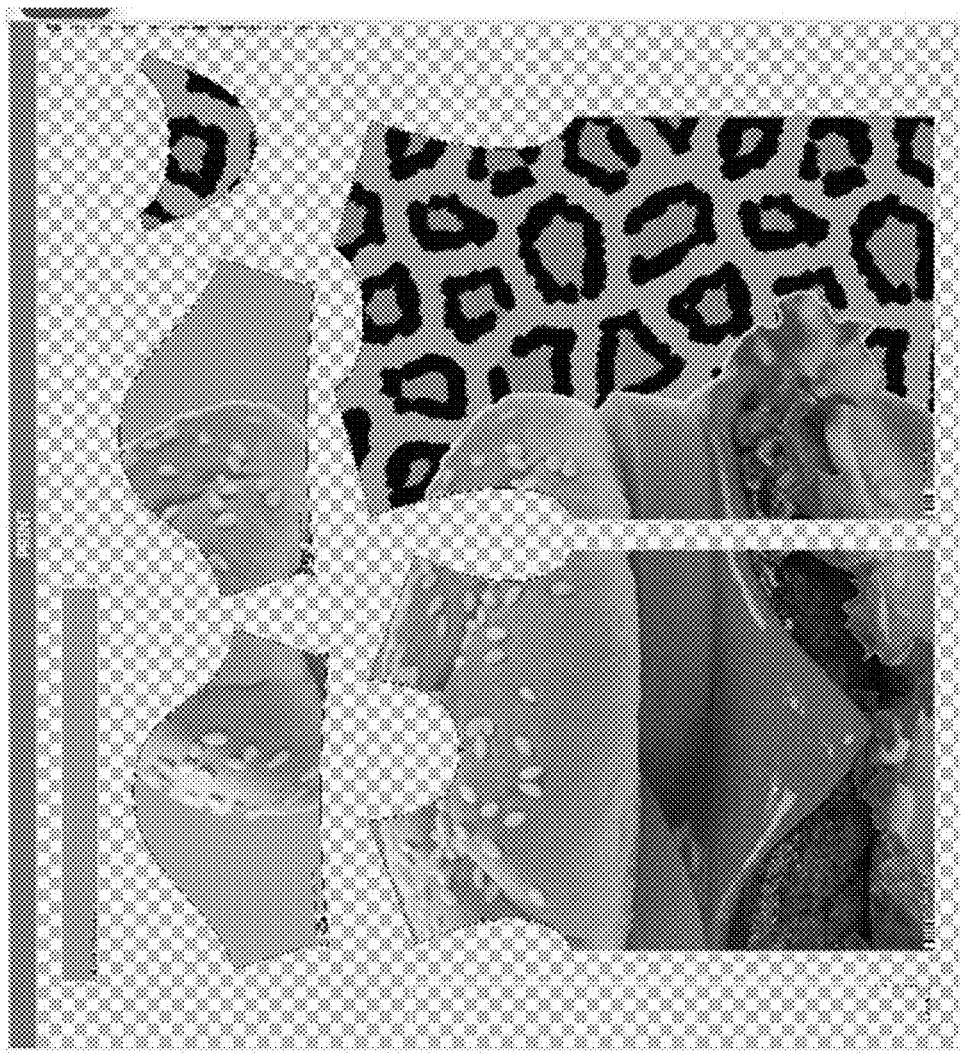

Referring to FIG. 17, a print server creates a print file 1700 based on the laid out user artwork, translating the 3D model to the 2D print file. The print file 1700 preferably has markings to denote sewing alignment and print metadata, such as order number. Upon creating the print file 1700, the object is ready to enter a manufacturing process. In the manufacturing process, the generated 2D print file is printed on a raw material (e.g., fabric). The individual components are cut and sewn together as per the cut and sew lines printed on the raw material to produce the desired product.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method of creating a product with a printed graphic image thereon comprising:
    storing, by a server system, definitions of a plurality of products, each product being composed of a plurality of components which are initially physically separate parts of the product that are subsequently joined together to form the product;
    receiving, over a network, indication of selection by a user of a first product from the plurality of products;
    receiving, over a network, indication of selection by a user of a graphic image for printing on the selected first product;
    receiving, over a network, information regarding placement of the selected graphic image on individually selected components of the selected first product,
    wherein the placement allows for the graphic image to span across and be printed on the individually selected components of the selected first product, the information received over the network including each of the individually selected components that the graphic image is desired to span across and be printed on;
    preparing, by the server system, a two-dimensional representation of the components of the first product with the selected graphic image arranged on the individually selected components; and
    causing the printing on a material of the two-dimensional representation of the components of the first product with the selected graphic image arranged on the individually selected components.

2. The method according to claim 1, wherein the definition of the selected first product comprises data regarding at least one cutting curve and data regarding at least one sewing curve for the plurality of components of the selected first product.

3. The method according to claim 2, wherein the data regarding at least one cutting curve comprises data defining splines which define a non-self-intersecting closed polygon.

4. The method according to claim 2, further comprising:
    cutting the material to form at least two components of the selected first product in accordance with the data regarding the at least one cutting curve; and
    sewing the at least two components together in accordance with data regarding the at least one sewing curve.

5. The method according to claim 2, wherein the data regarding at least one cutting curve and the data regarding at least one sewing curve comprise XML data defining splines.

6. The method according to claim 1, wherein the definition of the first product comprises data describing at least one visible printed area boundary.

7. The method according to claim 1, wherein the two-dimensional representation of the components of the first product with the graphic image arranged on the material comprises representations of at least two components with at least some of the same portion of the graphic image arranged thereon.

8. The method according to claim 1, further comprising:
    generating, by the server system, a three-dimensional rendering of the selected first product with the graphic image arranged thereon in accordance with the received information regarding placement of the selected graphic image; and
    causing display of the three-dimensional rendering of the selected first product with the graphic image arranged thereon.

9. The method according to claim 1, wherein preparing, by the server system, a two-dimensional representation of the plurality of components of the first product with the graphic image arranged thereon comprises:
    distorting the graphic image in accordance with distortion modifier grid data.

10. The method according to claim 9, further comprising:
    presenting a representation of the graphic image to a user with an overlaid representation of a grid;
    receiving input from a user regarding modification of the location of at least one grid point of the grid;
    modifying distortion modifier grid data responsive to the received input from a user regarding modification of the location of at least one grid point of the grid; and
    storing the modified distortion modifier grid data.

11. The method according to claim 1, wherein each definition of each product of the plurality of products includes at least one three-dimensional model of the product.

12. The method according to claim 1, wherein the product definition of the first product comprises data regarding at least two sizes of the product and further comprising:
    preparing, by the server system, a second two-dimensional representation of the plurality of components of the first product with the selected graphic image arranged on the individually selected components at a second size.

13. The method according to claim 1, wherein a distortion matrix is applied to generate a three-dimensional model of the first product with the graphic image arranged on the individually selected components.

14. The method according to claim 1, further comprising manufacturing the first product with the graphic image arranged on the individually selected components in response to receiving a manufacture command from the first user.

15. The method according to claim 1, wherein having the graphic image arranged on the individually selected components comprises having only a portion of the graphic image arranged on the individually selected components.

16. The method according to claim 1, wherein the placement allows for the graphic image to be placed on and be printed on an entire region of a component, the information received over the network including each of the plurality of components that the graphic image is desired to be placed on and printed on an entire region thereof.

17. The method according to claim 16, wherein for a plurality of components which are joined by seams, the graphic image to be placed on and printed on the plurality of individually selected components traverse contiguous seams.

18. The system according to claim 1, wherein the placement allows for the graphic image to be placed on and be printed on an entire region of a component, the information received over the network including each of the plurality of components that the graphic image is desired to be placed on and printed on an entire region thereof.

19. The system according to claim 18, wherein for a plurality of components which are joined by seams, the graphic image to be placed on and printed on the plurality of individually selected components traverse contiguous seams.

20. A system for manufacturing a customized product, the system comprising:
a print system for printing a two-dimensional graphic image on a material; and
a server system configured to:
store definitions of a plurality of products, each product being composed of a plurality of components which are initially physically separate parts of the product that are subsequently joined together to form the product;
receive, over a network, indication of selection by a user of a first product from the plurality of products;
receive, over a network, indication of selection by a user of a graphic image for printing on the selected first product;
receive, over a network, information regarding placement of the selected graphic image on individually selected components of the selected first product,
wherein the placement allows for the graphic image to span across and be printed on the individually selected components of the selected first product, the information received over the network including each of the individually selected components that the graphic image is desired to span across and be printed on;
prepare a two-dimensional representation of the components of the first product with the selected graphic image arranged on the individually selected components; and
cause the printing on the material of the two-dimensional representation of the components of the first product with the selected graphic image arranged on the individually selected components on the print system.

21. The system according to claim 20, further comprising:
a cutting system for cutting the material to form at least two components of the selected first product in accordance with the data regarding the at least one cutting curve associated with the definition of the first product; and
a sewing system for sewing the at least two components together in accordance with data regarding the at least one sewing curve associated with the definition of the first product.

22. The system according to claim 20, wherein the server system is further configured to:
present a representation of the graphic image to a user with an overlaid representation of a grid;
receive input from a user regarding modification of the location of at least one grid point of the grid;
modify distortion modifier grid data responsive to the received input from a user regarding modification of the location of at least one grid point of the grid;
store the modified distortion modifier grid data; and
distort the graphic image in accordance with distortion modifier grid data.

23. The system according to claim 20, wherein each definition of each product of the plurality of products includes at least one three-dimensional model of the product and wherein the server system is further configured to:
generate a three-dimensional rendering of the selected first product with the graphic image arranged on the individually selected components in accordance with the received information regarding placement of the selected graphic image; and
cause display of the three-dimensional rendering of the selected first product with the graphic image arranged on the individually selected components.

24. The system according to claim 20, wherein the two-dimensional representation of the components of the first product with the graphic image arranged on the individually selected components on the material comprises representations of at least two components with at least some of the same portion of the graphic image arranged on the individually selected components.

* * * * *